United States Patent
Kreitler et al.

(10) Patent No.: US 9,607,092 B2
(45) Date of Patent: Mar. 28, 2017

(54) MAPPING METHOD AND SYSTEM

(75) Inventors: Jeremy Kreitler, San Francisco, CA (US); Ali Diab, Menlo Park, CA (US)

(73) Assignee: EXCALIBUR IP, LLC, Sunnyvale, CA (US)

(*) Notice: Subject to any disclaimer, the term of this patent is extended or adjusted under 35 U.S.C. 154(b) by 1071 days.

(21) Appl. No.: 11/137,603

(22) Filed: May 25, 2005

(65) Prior Publication Data

US 2006/0026170 A1 Feb. 2, 2006

Related U.S. Application Data

(63) Continuation-in-part of application No. 10/849,083, filed on May 19, 2004.

(60) Provisional application No. 60/471,822, filed on May 20, 2003.

(51) Int. Cl.
*G06F 17/30* (2006.01)

(52) U.S. Cl.
CPC .... *G06F 17/3087* (2013.01); *G06F 17/30061* (2013.01); *G06F 17/30241* (2013.01); *G06F 17/30994* (2013.01)

(58) Field of Classification Search
CPC .................................................. G06F 17/30061
USPC .................................... 707/10, 763; 709/203
See application file for complete search history.

(56) References Cited

U.S. PATENT DOCUMENTS

| | | | |
|---|---|---|---|
| 5,802,492 A | 9/1998 | DeLorme et al. | |
| 5,818,455 A | 10/1998 | Stone et al. | |
| 5,884,218 A | 3/1999 | Nimura et al. | |
| 6,148,260 A | 11/2000 | Musk et al. | |
| 6,240,360 B1 * | 5/2001 | Phelan | G01C 21/26 345/641 |
| 6,297,748 B1 * | 10/2001 | Lappenbusch et al. | 340/905 |
| 6,307,573 B1 | 10/2001 | Barros | |
| 6,321,158 B1 | 11/2001 | DeLorme et al. | |
| 6,405,129 B1 | 6/2002 | Yokota | |
| 6,430,602 B1 | 8/2002 | Kay et al. | |
| 6,493,630 B2 | 12/2002 | Ruiz et al. | |
| 6,772,142 B1 | 8/2004 | Kelling et al. | |
| 6,836,270 B2 | 12/2004 | Du | |
| 6,999,825 B2 * | 2/2006 | Inomata | G07F 17/0014 340/5.73 |
| 7,092,892 B1 | 8/2006 | Sobalvarro et al. | |
| 7,249,160 B2 | 7/2007 | Nozaki et al. | |
| 2002/0046232 A1 * | 4/2002 | Adams | G06F 17/30206 709/200 |

(Continued)

OTHER PUBLICATIONS

Expedia.com®, http://www.expedia.com/pub/agent.dll?qscr=htfv&itid=&itdx=&itty=&from=f, 6pp., May 5, 2003.

(Continued)

*Primary Examiner* — Chelcie Daye
(74) *Attorney, Agent, or Firm* — James J. DeCarlo; Greenberg Traurig, LLP

(57) ABSTRACT

A method comprises the steps of: transmitting a map request from a client computer to a server; receiving in the client computer data representing a map from a map server; receiving, in the client computer, dynamic, location-based data from a content provider separately from the data representing the map; generating within the client computer a rendering of the dynamic, location-based data overlaid on the map; and displaying the rendering on the client computer.

10 Claims, 22 Drawing Sheets

(56) References Cited

U.S. PATENT DOCUMENTS

| | | | |
|---|---|---|---|
| 2002/0067379 A1 | 6/2002 | Kenyon et al. | |
| 2002/0116336 A1 | 8/2002 | Diacakis et al. | |
| 2002/0129109 A1* | 9/2002 | Nozaki et al. | 709/206 |
| 2003/0083073 A1 | 5/2003 | Cossins et al. | |
| 2003/0093419 A1 | 5/2003 | Bangalore et al. | |
| 2003/0182052 A1 | 9/2003 | DeLorme et al. | |
| 2004/0044469 A1 | 3/2004 | Bender et al. | |
| 2004/0059659 A1 | 3/2004 | Safaei et al. | |
| 2004/0070678 A1* | 4/2004 | Toyama | G06F 17/30265 348/231.3 |
| 2004/0073538 A1 | 4/2004 | Leishmann et al. | |
| 2004/0143385 A1* | 7/2004 | Smyth et al. | 701/117 |
| 2004/0217884 A1* | 11/2004 | Samadani | G01C 7/00 340/995.14 |
| 2005/0027705 A1 | 2/2005 | Sadri et al. | |
| 2005/0268254 A1 | 12/2005 | Abramson et al. | |
| 2006/0271277 A1 | 11/2006 | Hu et al. | |
| 2007/0156332 A1 | 7/2007 | Wailes et al. | |

OTHER PUBLICATIONS

"GDT and TrafficCast to deliver real-time traffic information", http://www.gisdevelopment.net/news/viewn.asp?id=GIS:N_ezpcygua, 2 pp., Feb. 14, 2005.

TRAFFICCAST, The Power of Prediction™, "Add Value", http://www.trafficcast.com/index.html, 1 pg., Feb. 14, 2005.

TRAFFICCAST, The Power of Prediction™, "Company Vision", http://www.trafficcast.com/corporate/about.html, 1 pg., Feb. 14, 2005.

TRAFFICCAST, The Power of Prediction™, "Data Products and Services", http://www.trafficcast.com/services/service.html, 1, pg., Feb. 14, 2005.

TRAFFICCAST, The Power of Prediction™, "Market Segments", http://www.trafficcast.com/services/Marketseg.html, 1 pg., Feb. 14, 2005.

TRAFFICCAST, The Power of Prediction™, "Markets with Real Time Traffic Data", http://www.trafficcast.com/slides/TrafficCastT-TAMarket.html, 3 pp., Feb. 14, 2005.

TRAFFICCAST, The Power of Prediction™, "Partnerships and Customers", http://www.trafficcast, Customers/index.html, 4 pp., Feb. 14, 2005.

TRAFFICCAST, The Power of Prediction™, "Personalized Travel-Time Reports", http://www.trafficcast.com/demonstrations/reports/text/alerts.html, 1 pg., Feb. 14, 2005.

TRAFFICCAST, The Power of Prediction™, "Products and Services". http://www.trafficcast.com/services/index.html, 1 pg., Feb. 14, 2005.

TRAFFICCAST, The Power of Prediction™, "Time-Dependent Routing", http://www.trafficcast.com/demonstrations/routing/time_dependent/pre_trip_planning.html, 2 pp., Feb. 14, 2005.

TRAFFICCAST, The Power of Prediction™ "TrafficCast Demonstrations", http://www.trafficcast.com/demonstrations/index.html, 1pg., Feb. 14, 2005.

TRAFFICCAST, The Power of Prediction™ "TrafficCast Speed Map", http://www.trafficcast.com/demonstrations/maps/smartmap.html, 1 pg., Feb. 14, 2005.

TRAFFICCAST, The Power of Prediction™ "TrafficCast Value Proposition", http://www.trafficcast.com/services/valueprop.html, 1 pg., Feb. 14, 2005.

Cederoth, R.A. et al. (Aug. 19, 2004). "Expedia, Inc.'s Third Supplemental Objections and Responses to Civix's First Set of Interrogatories," *Civix-DDI, LLC* v. *Cellco Partnership d/b/a Verizon Wireless, Expedia, Inc., Travelscape, Inc. and Verizon Information Services, Inc.*, United States District Court for the Northern District of Illinois, Eastern Division, Case No. 03-C-3972, 12 pages.

Cederoth, R.A. et al. (Feb. 28, 2005). "Travelscape, Inc.'s Sixth Supplemental Objections and Responses to Civix's First Set of Interrogatories," *Civix-DDI, LLC* v. *Expedia, Inc., Travelscape, Inc. and Verizon Information Services, Inc.*, United States District Court for the Northern District of Illinois, Eastern Division, Case No. 03-C-3972, 28 pages.

Chefitz, J. et al. (May 4, 2005). "Verizon Information Services's Second Supplemental Objections and Response to Civix's Interrogatory No. 3," *Civix-DDI, LLC* v. *Expedia, Inc.; Travelscape, Inc.; and Verizon Information Services, Inc.*, United States District Court for the Northern District of Illinois, Eastern Division, Case No. 03-C-3972, 7 pages.

Delorme, Inc. (2002). "Street Atlas USA 2003 User Guide," The Apache Software Foundation, 1999-2000, located at <http://support.radioshack.com/support_computer/doc69/69511.pdf>, pp. 1-141.

Expedia, Inc. 2006. "Expedia.com," located at <http://www.expedia.com/Default.asp?CCheck=1&>, last visited Nov. 2, 2006, 2 pages.

Hornæk, K. (Dec. 2002). "Navigation Patterns and Usability of Zoomable User Interfaces With and Without an Overview," *ACM Transactions on Computer-Human Interaction* 9(4):362-389.

Hrut, C.B. (Sep. 1993). "Navigation Technologies: Executive Summary," *Mobile World Conference Proceedings*, 22 pages.

International Search Report and Written Opinion mailed Mar. 6, 2007, for PCT Application No. PCT/US2006/040270 filed on Oct. 13, 2006, 12 pages.

International Search Report and Written Opinion mailed Jan. 22, 2008, for PCT Application No. PCT/US06/19223 filed on May 17, 2006, 10 pages.

International Preliminary Report on Patentability mailed on Mar. 19, 2009, for PCT Application No. PCT/US2006/019223, filed on May 17, 2006, 9 pages.

\* cited by examiner

MAPPING METHOD AND SYSTEM

This application is a continuation in part of U.S. patent application Ser. No. 10/849,083, filed May 19, 2004, which claims the benefit of U.S. Provisional Patent Application No. 60/471,822, filed May 20, 2003.

FIELD OF THE INVENTION

The present invention relates to computer-network-based mapping systems.

BACKGROUND

Many online databases are concerned with data items that are inherently location based. For example, an online database of hotels or a database of real estate listings or a database of weekend garage sales can all have locations in the form of street addresses associated with them. In all these cases, the location information is an important aspect of each item, however, in many systems there is no easy way for the user to interact with the location aspect of the data.

For example, it is known to provide a web-based system that shows maps with numbered icons in response to a user's query. For example, if the user requests information on hotels in Miami, the system will show the user what hotels are available by displaying numbers at the locations on the map corresponding to the hotels. The user has to look up the number of the hotel on a legend, to find out what hotel corresponds to the number, and the user must then follow a link to another web page to obtain information about that hotel.

An improved system for presenting location information in response to a user's query is desired.

SUMMARY OF THE INVENTION

In some embodiments, a method comprises the steps of: transmitting a map request from a client computer to a server; receiving in the client computer data representing a map from a map server; receiving, in the client computer, dynamic, location-based data from a content provider separately from the data representing the map; generating within the client computer a rendering of the dynamic, location-based data overlaid on the map; and displaying the rendering on the client computer.

In some embodiments, a method comprises the steps of: transmitting a map request from a first user at a first client computer to a web server, including a request for data representing a map provided by the web server, and for user-defined location-based data stored on a second client computer operated by a second user but not permanently stored on the web server, wherein the user-defined location-based data are transmitted from the second client computer to the server in a transmission initiated by the server in response to the map request; receiving, in the first client computer, data representing the map; receiving, in the first client computer, a representation of the location-based data, wherein the server transmits the user-defined location-based data to the first client computer separately from the data representing the map; generating within the first client computer a rendering of icons representing the user-defined location-based data overlaid on the map; and displaying the icons on the map at the first client computer at corresponding locations to which the location-based data pertain.

In some embodiments, a method comprises the steps of: transmitting a map request from a client computer to a first web server, the map request including a request for data representing a map that is stored in a second web server and for location-based data that are stored in the first web server, wherein the first web server requests that the second web server transmit the data representing the map and the location-based data to the client computer in response to the map request from the client computer, and the second web server obtains the location-based data from the first web server; receiving, in the client computer, data from the second web server representing the map separately from a representation of the location-based data; generating within the client computer a rendering of the user-defined location-based data overlaid on the map; and displaying the user-defined location-based data on the map on the client computer at corresponding locations to which the data pertain.

DETAILED DESCRIPTION

Figure 1:
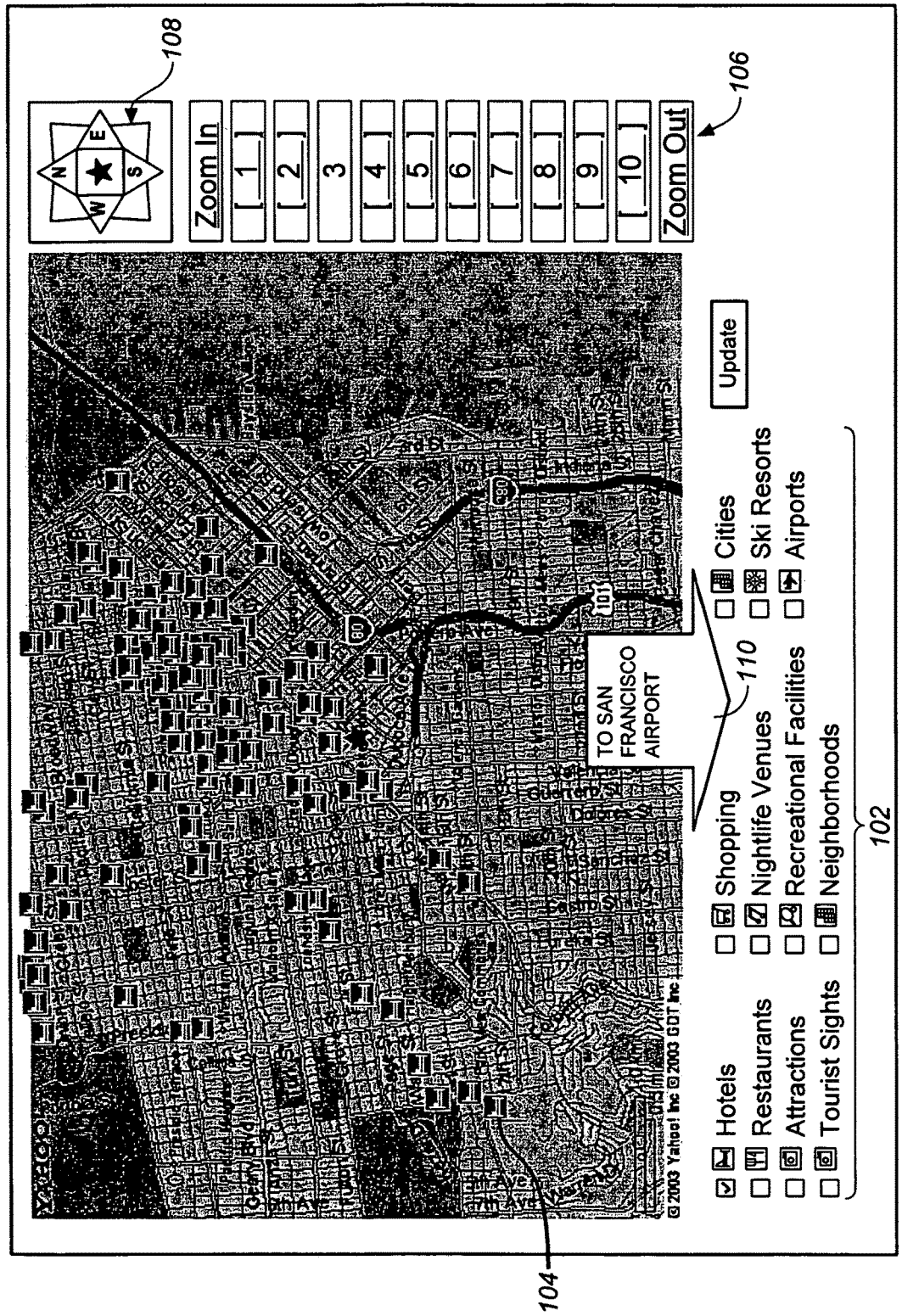
FIG. 1 shows a map display with hotel icons at locations corresponding to hotels.

U.S. Provisional Patent Application No. 60/471,822, filed May 20, 2003, and U.S. Patent Application Publications US 2004/0073538 and US 2005/0027705, and U.S. Pat. Nos. 6,240,360 and 6,317,686 are incorporated by reference as though set forth herein in their entireties.

This description of the exemplary embodiments is intended to be read in connection with the accompanying drawings, which are to be considered part of the entire written description.

An exemplary method of presenting location based items, integrated with a geographical map, allows the user to obtain detailed information about the items and their spatial relationships, and to control their display.

The term "items" as used herein are not limited to public, historic or well known landmarks and attractions, but broadly cover a wide variety of objects or locations, such as buildings, monuments, artworks, tracts of land or other items that may be of interest to any person, for either tourist, commercial, residential, academic, historic or religious reasons, for example. Thus, a hotel, a restaurant, a store, a ski resort, an airport, an apartment, a house, a housing development, or a city, a church, a bank, a school and a hospital may all qualify as items, and may be considered landmarks or attractions. Additionally, items could include dynamic location based information such as atmospheric conditions at a particular location, the position of a vehicle, environmental measurements taken at specific locations, for example.

An exemplary system allows the user to specifically input special queries on the data, and superimposes the results on a map graphically. For example, the user may input a query for hotels within a particular price range, and the user is also able to visually locate the hotels that are close to restaurants, the beach or other landmarks the user wants displayed. The user is also able to view information, integrated with the icons, without having to go to another web page to see those details. Various types of landmarks and attractions are all embedded in the map, and the user can selectively display the desired types of landmarks as icons on the map.

For example, in the case of the hotel database, the user may want to do any of the following:

see the hotels displayed at their proper location on a map so that the user can decide at which hotel he or she is interested in staying, based on its proximity to some geographical feature (e.g. the beach) or other landmark (e.g. the airport, a conference center) displayed on the map.

The system can receive a user defined distance value, and first and second user defined item types, wherein the displayed map includes items of a first one of the types that are located within the user defined distance of an item of a second one of the types. For example, the map can display hotels that match certain criteria, such as being within 10 miles of the airport and the zoo, and also match other non-geographical information such as room rates.

visually locate popular neighborhoods based on the density of shopping, restaurants and other tourist attractions and use that information to select a hotel.

The above examples easily translate to other areas, such as real estate, where users might want to filter data based on proximity to highways, schools, their work and other factors such as rent or the number of bedrooms. For example, in a real estate application where the user wants to view homes for sale on a map, one of the input criteria could be houses within 10 miles of a given school, or within five miles of the school and 10 miles of a given highway on-ramp. Although this example finds items within a given radius of a landmark, other embodiments may find items within a specified restricted boundary. In still other embodiments the search looks for items, 'between'—bounding box or corridor around a route. If the route is a straight line between two selected points, the search looks for items within a rectangle containing the two points. If the route between two points is defined by a plurality of connected line segments that extend in different directions, the search can identify items within a given corridor or perpendicular distance around any one of the line segments. In the real estate example, the database of landmarks may contain more items of interest to home buyers, such as the locations of schools, bus stops, train stations, shopping, hospitals, churches, synagogues and mosques, and the like.

Although the example shown displays the results of the search query without ranking them against each other, in other embodiments, a local search relevance algorithm is used to provide a list of what elements are involved in determining relevance for local searches (e.g., distance, title, category, word index from official web site or the like). Optionally, a weighted score can be computed for each item, based on the values of these attributes.

In other embodiments, the mapping facility may be used for a business-to-business directory. The item types may correspond to vendors of various goods and/or services. Thus, a business person, in seeking to locate a branch office or factory, may wish to see what resources are available to serve that business, as well as businesses that may be potential customers.

In some embodiments, the mapping facility permits the user to specify location queries using a non-postal addresses (e.g., using a landmark name, business name, or personal address book) for use as a local search input parameter. Such embodiments could include generating a map using one of the landmarks as a center point, or generating a map of a corridor of a user specified width connecting two landmarks. For example, a query might include parks within 25 miles of a route connecting Big Sur Park and Muir Woods Park in California.

Preferred Embodiments

An exemplary implementation of the above concept is described for a hotel database. In this implementation, a variety of travel-related items are displayed on the map, including hotels, airports, restaurants, attractions, and the like.

Each map is defined by its center point (e.g., latitude/longitude or any other geocoding standard), the zoom level and the items that are displayed on it. Although the example refers to longitude and latitude, one skilled in the art would understand that this can be any type of geocoding technology.

Each class of items on the map is represented by a respective icon. For example, hotels are displayed by icons depicting a bed. It is possible to have unique icon designs for individual items as well.

For any given map defined by its center point and zoom level, only items that fall within the geographical area of the map are displayed by the system. Furthermore, only items that meet the user's filtering criteria (e.g. hotel price <$100/night) are displayed. It is possible for the user to change the filtering criteria and request that the map be updated to reflect the changes. In this implementation, it is possible to filter hotels based on their price, but also by size, amenities, association or other user defined criteria.

Some embodiments allow the user to navigate around the map by zooming and panning around. These functions are achieved by clicking around the map and the zoom level controls, respectively.

Some embodiments allow the user to restrict the display of the items to a certain radius around the map center. For example, the user may want to only display hotels within a 2 mile radius of the map center.

Some embodiments allow the user to toggle the display of entire classes of items. For example, the user may choose to view only hotels and restaurants. In some embodiments, this is achieved using checkbox controls associated with each class of items.

FIG. 1 shows an exemplary map 100 with a display of San Francisco. A plurality of checkboxes 102 are provided beneath the map 100. In FIG. 1, only the "hotels" icon 104 is checked. An icon 104 representing a hotel is displayed at the location on the map corresponding to each hotel in the database. FIG. 1 also shows zoom controls 106 and pan controls 108. By clicking on one of the zoom levels 106, the radius is changed. By clicking on one of the directional arrows (N, E, S or W) 108, the map 100 pans over to a new center point.

Figure 2:
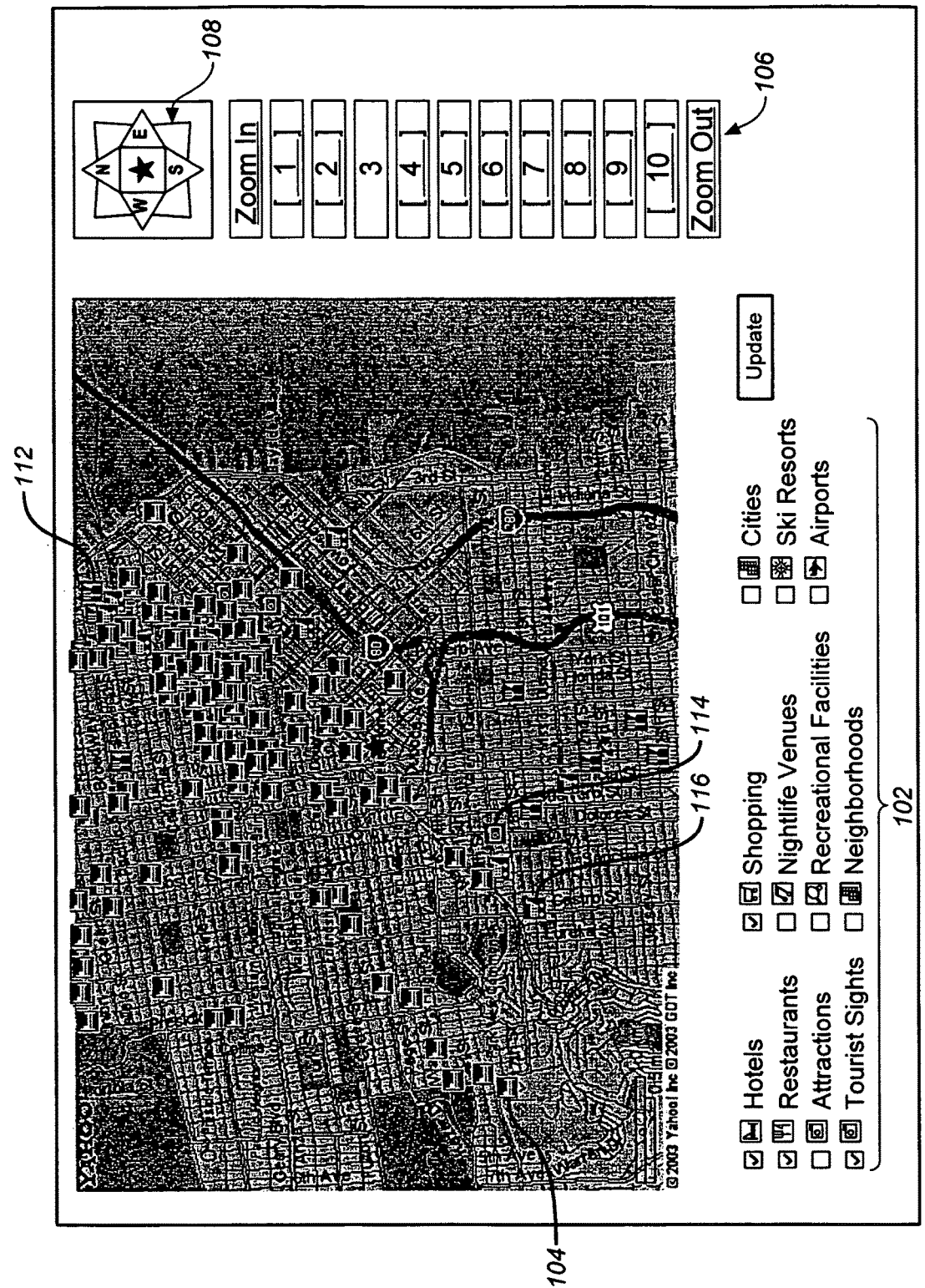
FIG. 2 shows a map display with hotel, restaurant, tourist sight and shopping icons at locations corresponding to the locations of the actual attractions.

FIG. 2 shows the same map 100, with additional checkboxes 102 corresponding to restaurants, tourist sights and shopping checked. Upon checking additional boxes and clicking the "update" button, the system adds icons 112 (restaurants), 114 (tourist sights), and 116 (shopping), corresponding to each of these landmark types. FIG. 2 shows several fork-and-knife icons 112 at the locations of restaurants, camera icons 114 at the locations of tourist sights, and shopping cart icons 116 at the locations of stores.

Different classes of icons may be displayed at different zoom levels. The detail level is adjusted for the user's zoom level so that when the user is at a very high zoom level, e.g., the street level, more street level details are visible. For example, hotels are only of interest to the user at relatively high zoom levels (city, neighborhood or street level), but not at low zoom levels (state, country or world). Therefore, hotels are only displayed at high zoom levels.

On the other hand, when zoomed out, only very big items like cities and ski resorts or airports that might be of interest to people on a large (e.g., continental U.S.) map would be displayed. For example, major airports are relevant at all zoom levels and are therefore displayed at all zoom levels.

If the user requests a San Francisco map, at that level, the system will try to fit San Francisco city inside the map, and determine the appropriate zoom level. If, on the other hand, the user has selected a hotel, for example, and wants to see it on the map, then the resulting map is more zoomed in so that only the vicinity of that hotel is displayed.

In some embodiments, the user selects the zoom level that fits within the map (for example, by selecting one of the zoom controls 106). In other embodiments, if the user inputs a query that requests sites (e.g., hotels, restaurants) within a user defined radius of a city or center point, the map automatically zooms in or zooms out to accommodate that radius.

Figure 3:
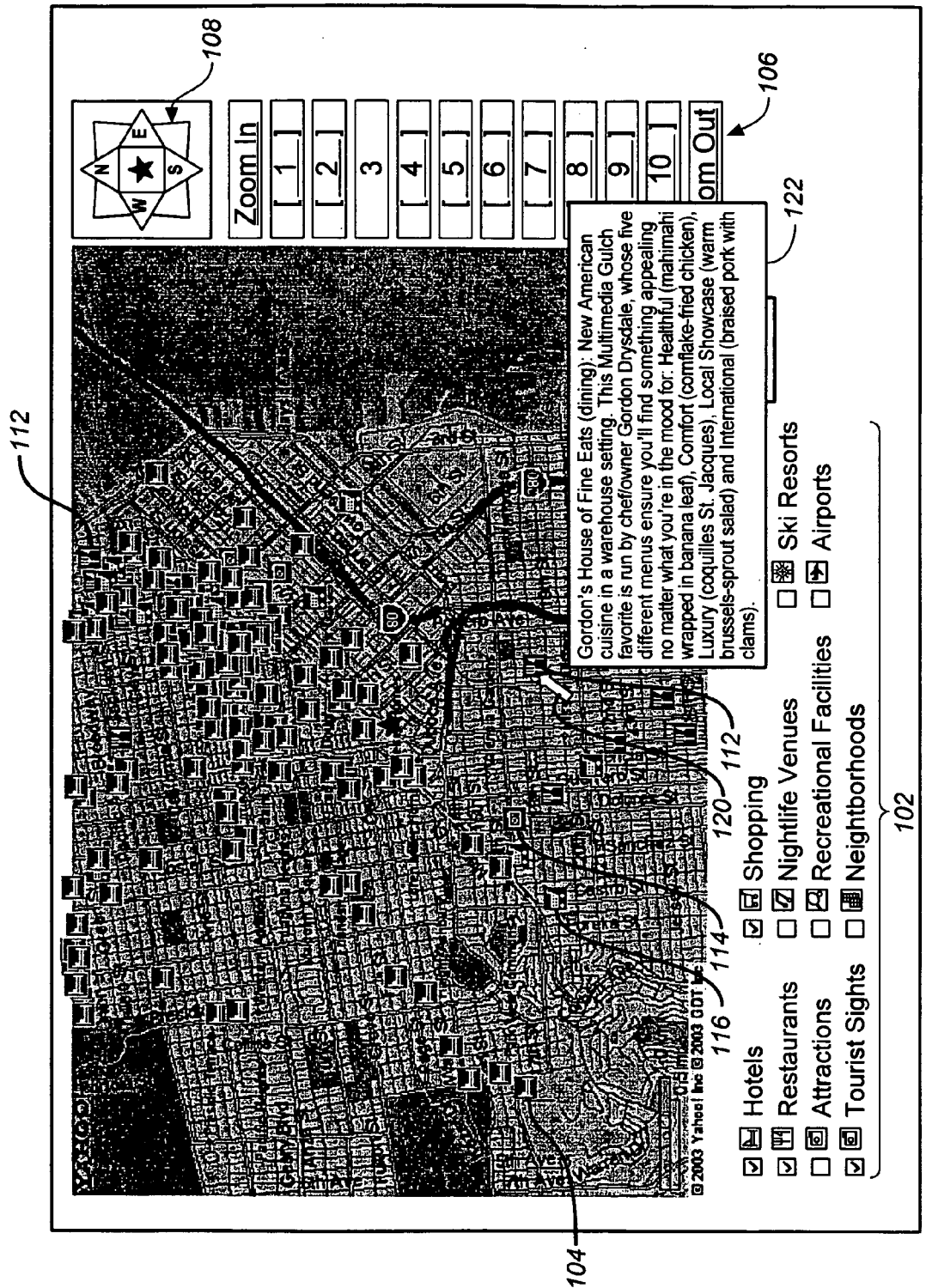
FIG. 3 shows a summary of an attraction displayed when the cursor hovers over one of the icons of FIG. 2.

Each item's icon 104, 112, 114, 116 allows the user to interact with that item. For example, hovering the cursor of the mouse (or other pointing device) over an icon allows the user to view a summarization of pertinent information about that item. FIG. 3 shows an example in which the user hovers the cursor 120 over a restaurant icon 112. A summary 122 of the restaurant is displayed. A restaurant summary 122 may include, for example, the description, cuisine, rating (e.g., number of stars out of 4), and price range. In the case of a hotel, this summary may include the hotel name, address, room rate, or special offers available at this time, and perhaps an image of a room interior. In some embodiments, by hovering the cursor 120 over any icon, a floating window (not shown) is displayed next to the icon that indicates whether an image of that item is available in addition to its address and a short description.

It is also possible for the icon to allow the user navigational choices (by clicking on the icon). For example, in the case of a 'city' icon, the system can allow the user to jump to a higher zoom level and re-center the map around the center of the icon with one click. Alternatively, the icon may have hyperlinks to other parts of the information system. For example, in the case of a hotel, one link may allow the user to visit another screen with more detailed information and another link that allows the user to book a room in that hotel. In some embodiments, venue or restaurant seating charts are overlaid with information on specific seating availability and price. This feature allows the user to select which seats he or she would like to purchase.

The system can display special (distinctive) icons for items that are not positioned on the map but nonetheless may be of interest to the user. For example, in the case where hotels are displayed, the user may want to know where the closest airport is situated. The system can display a link that adjusts the map state such that the closest airport is brought into view.

In some embodiments, the links are shown visually on the map. For example, if the user is looking at the center of San Francisco, and San Francisco International Airport is to the south of the city, an icon may be displayed on the south border of the image that points in the general direction of San Francisco Airport. For example, as shown in FIG. 1, the special icon 110 may be an arrow icon which is easily distinguished from the other types of icons on the image. When the user clicks on that icon 110, the system re-centers and resizes (re-zooms) the map to show San Francisco Airport in the image. Any type of icon may be used for this purpose, so long as it is easily distinguishable from the other icon types.

In other embodiments, a link (not shown) is displayed next to the airport category that says, for example, "Take me to the closest airport." For example, when the search is performed, a larger radius may be used than the radius that currently fits on the map. The system would recognize that this airport is close by (e.g., within 100 miles), but it doesn't fit on the map, so the link or specific icon is displayed that allows the search and jump so the user is able to see that item.

It is also possible for the user to 'select' an item/items and obtain navigational information about them. For example, selecting a hotel would allow the user to obtain the distance of other items in relation to the selected hotel, or obtain driving directions from the selected hotel to the other item.

In some embodiments, this capability is provided graphically. For example, the user can select any of the items as a first point. Then the user can select any other item on the map as a second point and obtain extra information. For example, the system may identify the distance between the two points and, optionally, provide the driving directions from the first point to the second point. Additional information such as the approximate driving time between the points and/or the direction of a straight path connecting the two locations may optionally be provided. In some embodiments, the locations of the two points are fed to an existing driving map and distance program, such as the Yahoo! maps driving direction feature. Alternatively, the system can calculate the distance between the two points from the latitudes and longitudes of the two points using trigonometric functions (or other view coding format). The result will be a web page generated by Yahoo! maps. (I.e., the results are presented in a Yahoo! web page, as opposed to just extracting the driving direction in raw form and displaying them in a front end interface.) In other embodiments, when the user selects two points, the user is presented a link to such a driving map and distance program.

Synchronized List

Some embodiments, in addition to enabling the user to display items on a map representing any point with a geographic location (businesses, landmarks, events w/venues . . . etc), also allow the user to display a list that corresponds to all the points being displayed on a map. In some embodiments, this option allows two modes of identifying or finding a the point on the map: the user can select the icon on the map corresponding to the point in order to highlight the item in the list, or the user can select the item in the list in order to highlight the corresponding icon on the map. This mode may support the display of multiple sets of results as well through segmenting the lists.

Figure 16:
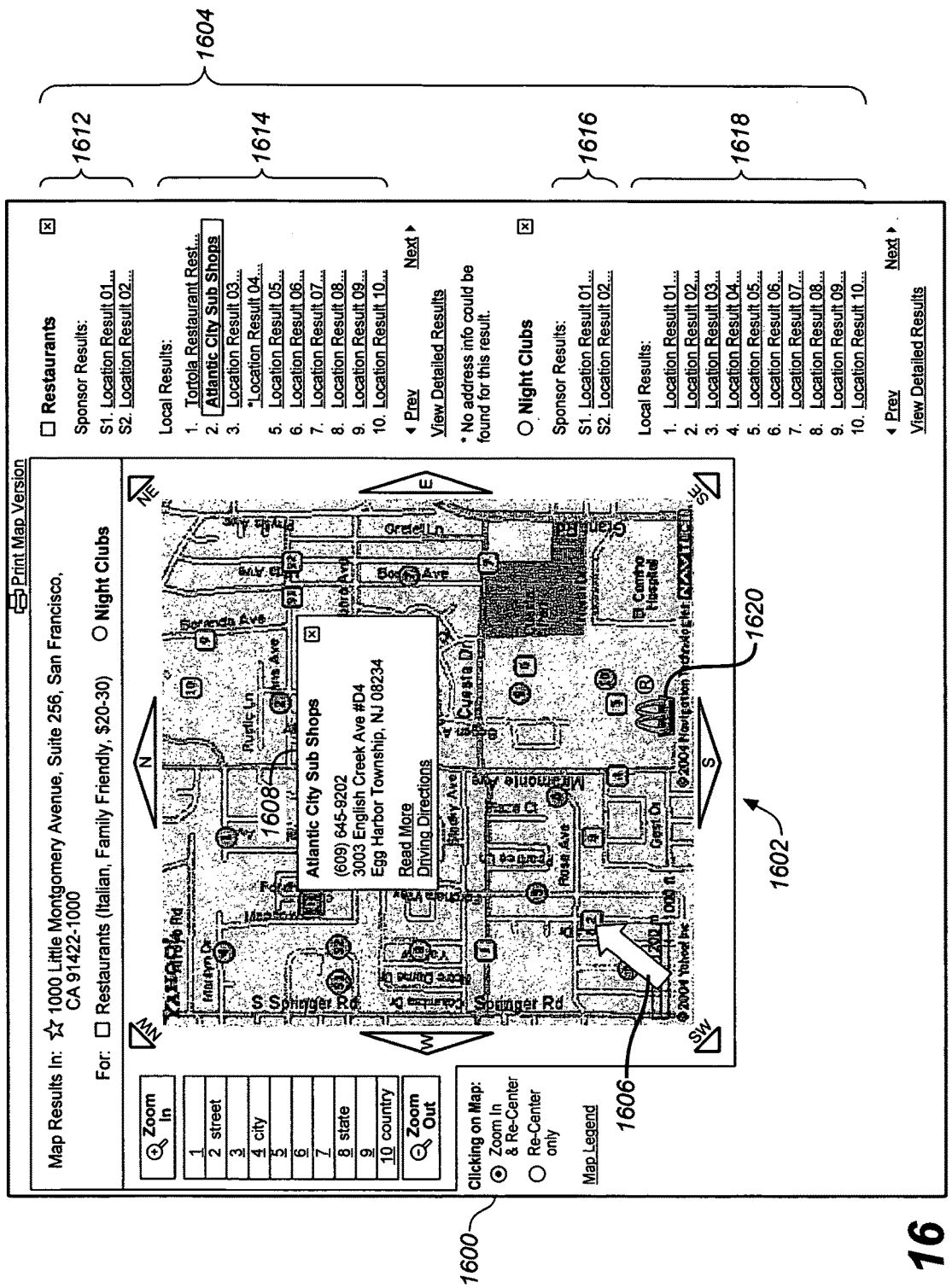
FIG. 16 is a display showing a synchronized map and list.

FIG. 16 shows an exemplary display 1600 including a synchronized map 1602 and list 1604 of items. When a result set comes back in response to a search query or the user's clicking on a link (or similar act to receive a map with multiple locations plotted on it), the same results that are graphically displayed on the map 1602 are generated as a text based list 1604 and displayed near the map area. A synchronizing means includes software program code, executed on the client or on the server, to synchronize the highlighting of map icons with the corresponding items on the list and vice-a-versa. The cursor 1606 is shown over restaurant icon number 2. The action of mouseing over or selecting (clicking) an item on the map will not only pop-up the informational window for the point but will also highlight the corresponding entry on the list. Thus, the corresponding restaurant number 2 in list 1604 is shown highlighted, for example, in reverse video. Alternatively, if the user mouses over or selects (clicks) the item (e.g., restaurant number 2) on the list 1604, the corresponding icon is highlighted (for example, by changing color, blinking, changing size, or the like). In either case (when either the icon on the map 1602 or the corresponding item in the text list 1604 is selected), a window or box 1608 containing summary information about the item is displayed on the map 1602, and the item is highlighted visually on the map 1602 and on the list 1604.

In some embodiments, the paid advertisers' items are listed separately from the icons corresponding to non-advertisers. For example, the items for the paying advertisers may be included at the beginning of the list, or in a first list above a second list (which contains non-advertisers). The paying advertisers' items may also be in a font that is larger, brighter, differently colored, or otherwise expected to increase the likelihood of capturing a user's attention. FIG. 16 also shows the list separated by sponsor/non-sponsor, as well as by type of item. In the example of FIG. 16, list 1604 includes four sections: a sponsor (advertiser) restaurant section 1612, a non-sponsor restaurant section 1614, a sponsor night club section 1616 and a non-sponsor night club section 1618. Thus, for every type of item or landmark, the items of that type can be listed, with the advertisers' names listed first, followed by the non-advertisers. In another embodiment (not shown) all sponsor items 1612 and 1616 appear at the top of the list 1604, and all of the non-sponsor items 1614 and 1618 appear at the bottom of the list 1604.

The results can be further filtered and sorted to refine the results sets a user receives in the application. These actions cause both the results on the map 1602 and the corresponding list 1604 to be modified to fit this new criterion.

Displaying Advertiser Business Locations on a Map

As noted above, in some embodiments, in addition to the normal types of icons that can be plotted on a map, a map can also be used to include icons paid for by an advertiser. These icons may be paid for and provided in a variety of ways.

For example, in some embodiments, the advertiser may pay a cost per 1000 impressions (abbreviated as "CPM") rendered. A CPM advertiser would pay a predetermined fee to the business that provides the maps, for every 1000 times that the advertiser's icon is displayed on a map generated by the method and system described herein.

In other embodiments, the advertiser may pay on a pay-for-performance (PFP or pay per click) basis. In these embodiments, the PFP advertiser would pay a predetermined fee each time that a user selects (e.g., clicks on) one of the interactive icons. In the case of the map with a synchronized list described above, payment would be based on the user either selecting one of the interactive icons or selecting the corresponding item in the text list. In another variation of PFP, the advertiser may pay based on conversions. For example, if clicking on the icon for a restaurant generates an online reservation form, the advertiser may pay the service each time that an online reservation is made using that online registration form.

The CPM and PFP options are useful if, for example, the advertiser wants to promote a physical business location. These locations are highlighted on a map and possibly on the corresponding list view of results as well. In some embodiments, the results can be distinguished visually or given higher prominence on the list, but it is not required they be displayed this way. For example, a generic restaurant icon can be displayed on the map for non-advertisers (restaurants in the database that do not subscribe to the map generating service), whereas paid advertisers may be indicated by an icon that is larger, brighter, and/or distinctive to the advertiser's business (e.g., the company's logo). For example, a restaurant corporate logo 1620 could be displayed. In some embodiments, the advertiser has the option of specifying a map icon or small logo specific to its locations to further visually distinguish the item. For a PFP listing, payment may be received either for a click on the icon/list or tracked based on a link embedded within the additional information that shows up on the informational window for the item.

The advertiser icons to be displayed on a map are determined by the various algorithms of a standard ad server or PFP engine (inventory available, % delivered on campaign, time . . . etc). Ads may be scheduled based on a measure of "urgency." For example, the measure of urgency can be based on the fraction of ads yet to be scheduled for an ad campaign, divided by the remaining fraction of the total duration of the campaign. In addition to these, the points representing locations of the items must fall within the map area being displayed (geographic targeting). In some embodiments, the paid advertisers' icons are only displayed if they correspond to the query term.

In other embodiments, the paid advertisers' icons are displayed so long as they correspond to the category for the search, regardless of whether they satisfy the user's query criterion. (For example, a paying restaurant's icon may be displayed even if the restaurant's price range is outside of the price range selected or input by the user.) Preferably, an indication is automatically provided to the user via appearance of the icon or some other display feature to notify the user if a given icon is being displayed due to a paid advertisement that lies outside of the range of the query criteria, so that the user is not misled by the displaying of the icon that does not satisfy the search criterion.

In some embodiments, the advertiser has the ability to specify the content and the link contained within the pop-up informational window 1608 for the item, if one is used.

User Interaction with Selection of Points

In some embodiments, once a user has plotted locations on a map and has a list of results that satisfy a query, the user has the ability to further customize or control the items displayed on their map by selecting only a subset of the items displayed that the user wants to continue to appear on the map. When the user executes one or more subsequent queries, the items selected for continued display remain on the map following a subsequent query, even if the items do not satisfy the search criterion of the subsequent query. These items can be selected across or on several different layered-on query results.

Figure 17:
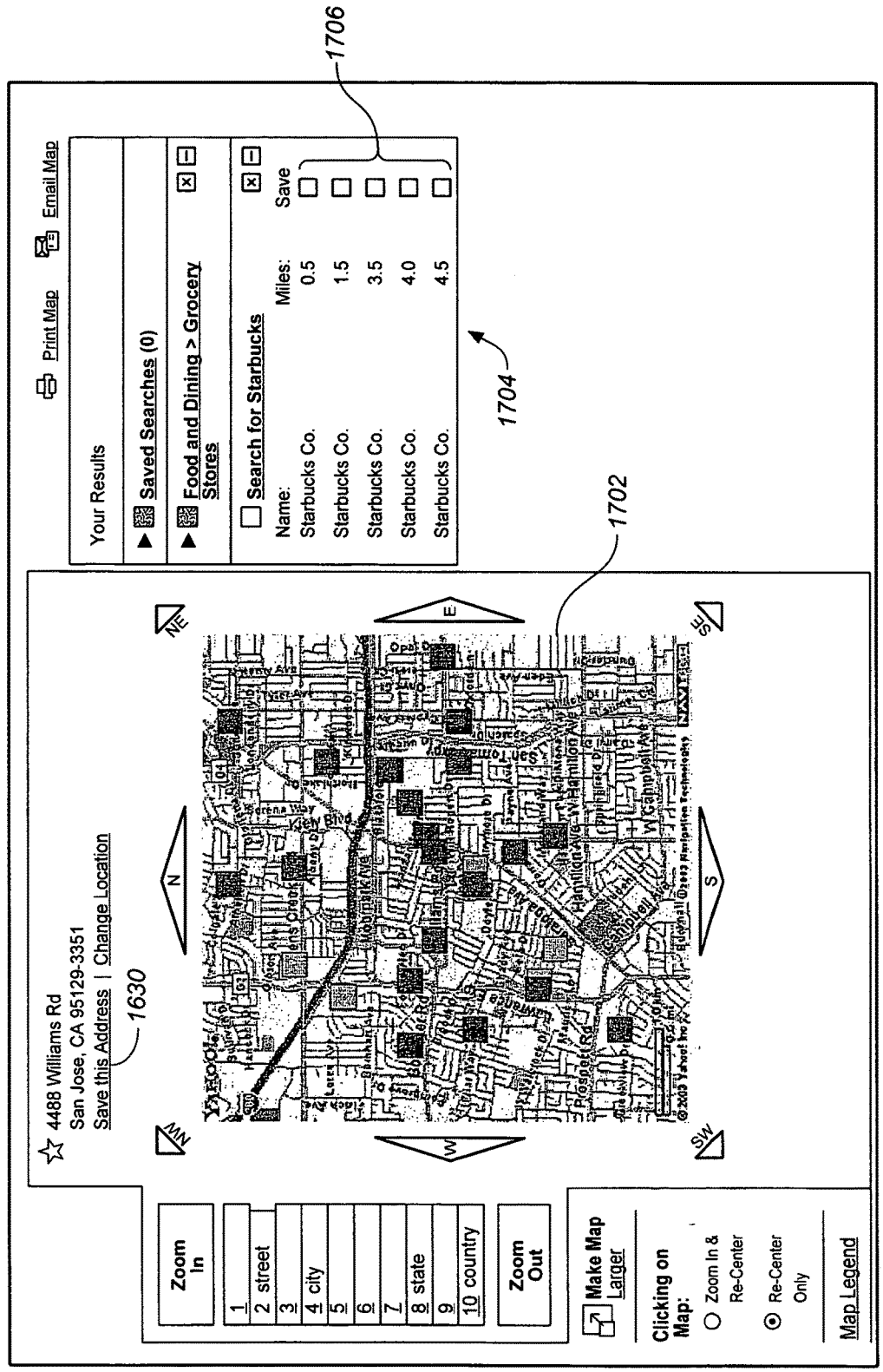
FIG. 17 is a display showing an optional field for selecting items for continued display.

For example, FIG. 17 shows a map 1702, next to which a selection box 1704 is provided. Within the selection box 1704, a plurality of checkboxes 1706 are displayed. The user can select any of the items in the selection box 1704 by selecting (e.g., checking) the box corresponding to that item. In some embodiments, as shown in FIG. 17, the items may be ranked by proximity to the center of the map, to allow the user to easily select the closest items to the center by merely selecting the items listed first. Also shown in FIG. 17, the capability may optionally be provided for the user to select a control 1630 to save the address of the center point of the map.

As an example of layered-on results, the user may select a subset of the items displayed in response to a first query as a first set of items for continued display. The items in the first set are subsequently displayed along with the results of a second query. The user can select a second subset of the points that are displayed in response to the second query, to be included in a second set of items for continued display. Subsequently, when a third (or fourth) query is executed, the first and second sets of points are displayed along with the items that satisfy the search criterion of the third (or fourth) query.

In some embodiments, the user is then provided the option to print a view of the map and the list that contains only the points that the user selected for continued display across the single or multiple queries.

In some embodiments, the software supports the ability to automatically readjust the zoom level to most appropriately display only those points selected for continued display. If this automatic capability is included, then preferably, the user is provided an option to override the default zoom level in the application.

The software used to customize the points plotted (by selecting points for continued display) can be executed either on the server side or on the client.

Preferably, a function is provided (not shown) to enable the user to switch back to the "default" non-customized view of the results with a single click. Following execution of this function, each map only includes the items that satisfy the query in response to which the map is displayed.

The duration these custom points are "saved" by the system can vary depending on the needs of the application, but can range any where from a single session with the application to being permanently saved to an address book associated with the user.

Figure 4:
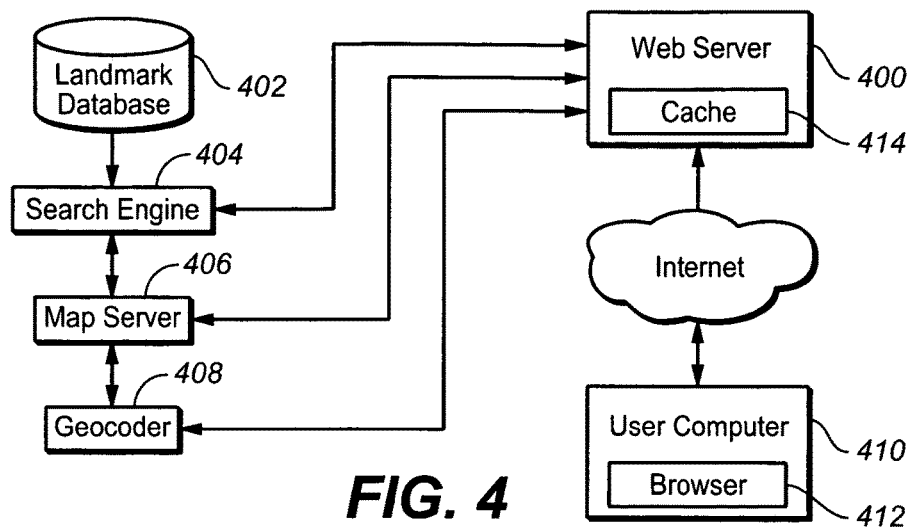
FIG. 4 is a block diagram of an exemplary system for rendering maps as shown in FIGS. 1-3.

Implementation Details:

FIG. 4 shows an exemplary system for providing interactive maps via the Internet. The system includes:

A Map server 406. The map server 406 is responsible for generating a map image given a center point and a zoom level. The map image contains relevant details such as streets, names and the like. In a preferred embodiment, the map server 406 is one developed and used by Yahoo! Maps.

A geocoder 408. The geocoder 408 is responsible for converting an address to a latitude and longitude. For example, 701 First Ave, Sunnyvale, Calif.→lat: 37.4174, long: −122.0243. Every item in the database 402 has a latitude and longitude attached to it, and given a center point latitude and longitude, the geocoder 408 computes a window which may be shaped like a rectangle that is slightly larger than the area the map is to encompass, so details are not missed on the edge. All items within that window that fall in the range are selected, and then the latitude and longitude are transformed to a pixel coordinate so that the icon for a landmark can be shown at the correct position on the map. The map is all based on latitudes and longitudes, and the latitude and longitude of the icon coordinates are transformed to pixel coordinates so that the icon can be placed on the correct location on the map. A latitude offset and latitude cosine correction are performed.

Some embodiments take advantage of the fact that correspondence between a given address and a latitude/longitude pair does not change, by storing this information in a cache (e.g., a cache 414 located at the mapping application or at the user's host). In cache embodiments, the geocoder 408 does not need to do the translation every time the user retrieves the same address. In other embodiments, each time the user types in an address, the geo coder is used to find the latitude and longitude of that address.

In a preferred embodiment, the geocoder 408 has the ability to perform interpolation for a street address that is in between the two closest locations in the latitude/longitude database. Linear interpolation may be used, although higher order interpolation is also acceptable.

Content database 402 of items. The system may have one or more content databases. Each database 402 contains information about different kinds of items, for example hotels, airports, restaurants, and also dynamic information such as weather conditions, traffic conditions, environmental measurements and the like. Each item in the database 402 has location information associated with it in the form of either an address or latitude and longitude. In the exemplary embodiment, the database 402 contains data aggregated and organized by Yahoo! Travel.

An exemplary list of the data fields or attributes in the database for each item may include:

name oid—unique identifier for the item. This is used to link an icon to more detailed information on a separate page.

description latitude longitude min/max price—used for display and filtering purposes (optional)

type—the category for the item (hotel, restaurant etc. . . . )

zoom—values are 1-9 and indicate the appropriate zoom level to display the item if the user decided to zoom in on the item (The value "9" means street level, such as a hotel. The value "5" means city level, used for ski resorts, airports)

zoomhigh, zoomlow—the range of zoom levels to display the item on the map when the user is browsing around. For example, for hotels, the value of zoomlow may be "6" and the value of zoomhigh may be "9," so that hotel icons are only displayed from the city level down to the street level.

url/title1,2,3—each item can display hyperlinks in its pop up display (e.g., for a hotel links may be provided to: make a reservation and/or to read more information. For a ski resort, links may be provided to: read more information and/or determine current conditions and/or buy lift tickets.

It will be understood by one skilled in the art that other data fields could be included, including metadata fields such as key words associated with the business or with the item, hours of operation, special promotions, and the like.

In some embodiments, the content database(s) are all owned and operated by the owner of the mapping application. Other embodiments use structured local data to find appropriately matching web content and attach this content to the structured data to enhance it.

The data items in the database 402 are processed through the geocoder component 408 and their address information is translated to a latitude and longitude. This information is used to display each item at the correct location on the map.

Search engine 404. The system may interact with one or more search engines. Each search engine 404 is used to locate data items that match the user's filtering criteria and are in the proximity of the map center point. The data items in the content database 402 are loaded into the search engine 404 periodically (whenever the data is updated/processed in the content database 402). Commercial products such as Oracle DBMS, or free ones such as MySQL DBMS could also be used for the search engine.

The search engines can be hosted locally or on remote servers, or the entire system can be on one device. The remote servers can even include third party servers. The communication between the mapping application 400 and the search engine 404 occurs over standard internet protocols (e.g., hypertext transport protocol, or HTTP) and the results from the mapping application are formatted in a parsable format (e.g., Extensible Markup Language, or XML). This design allows the system to easily incorporate items from disparate sources. Any other appropriate communication protocol may be used.

An interface application (e.g., web browser 412 or corresponding interface used on a mobile device including but not limited to a PDA or cell phone). The browser or another more specialized client application such as, but not limited to, an applet 412 in the user's computer or device 410 is used to interact with the intelligent mapping application software system 400. The browser 412 is responsible for rendering the intelligent mapping user interface, allow user interactions and transmit the user's request to the mapping application 400.

A mapping application 400 provides a mapping means for running the intelligent mapping software to generate and transmit the map to the server that receives the query from the user. This application 400 is used to coordinate the functions of the map server 406 and the search engine 404. The application 400 may include a cache 414.

A web server 416. The web server 416 manages the interaction between the web browser 412 and the mapping application 400.

Figure 5:
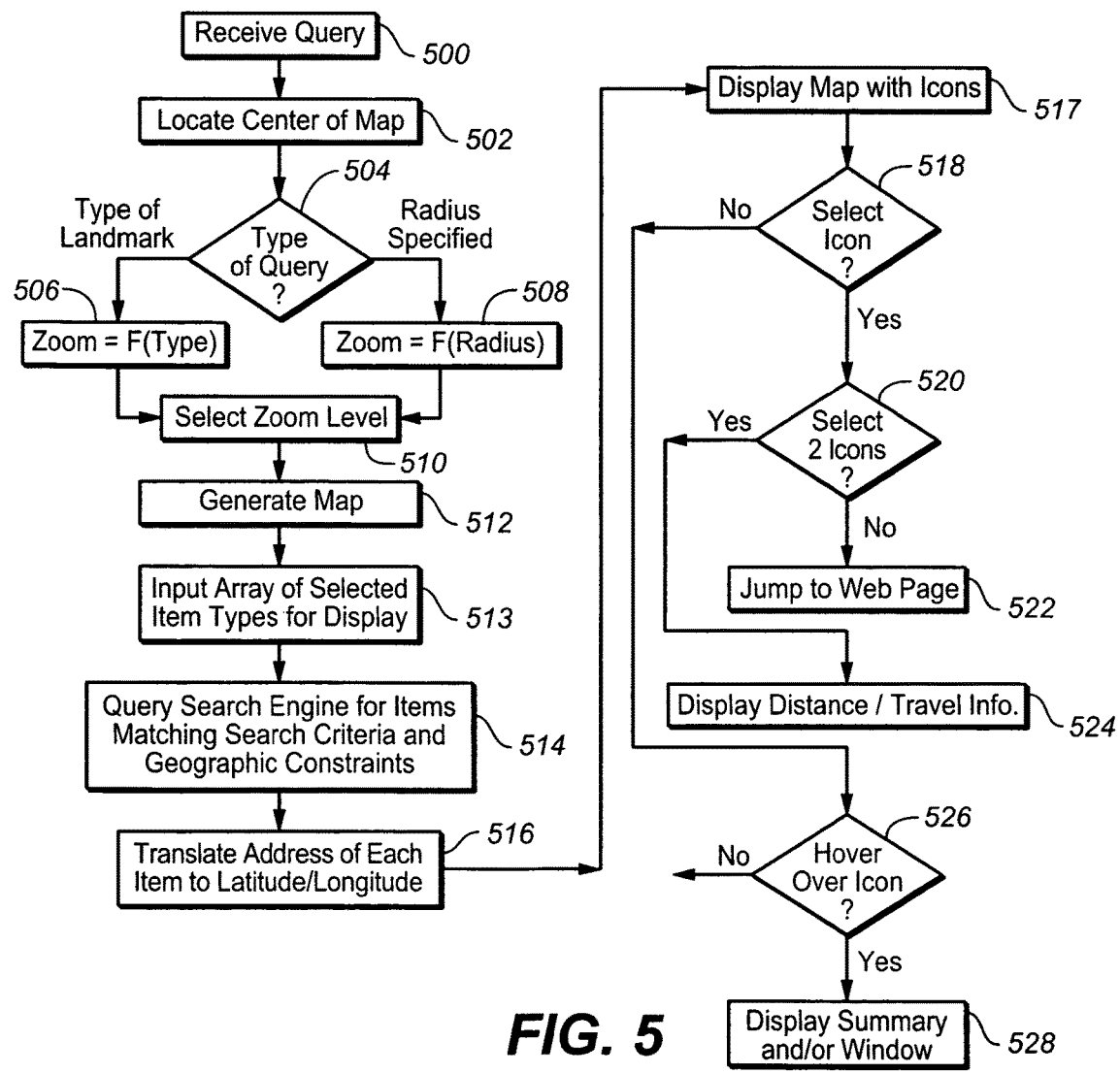
FIG. 5 is a flow chart diagram of the system of FIG. 4.

FIG. 5 is a flow chart showing steps performed for each request coming from the web browser 412, specifying a map center point, zoom level and filtering criteria, the software will perform the following steps:

At step 500, the mapping application 400 receives a query from the user. The query may request a particular type of landmark or attraction near an address. Optionally, the query may specify a radius within which the map is to be displayed.

At step 502, when the user requests display of a particular hotel, then the system finds the center point. For example, the center point may be the address of the hotel, so the system will have a center point, which the system can use to generate the image.

At step 504, the type of query (e.g., a query based on the type of landmark specified, or a query based on a radius around a given location) is determined.

At step 506, if no radius is specified, the map server selects the zoom level as a function of the type of landmark(s) identified in the query (e.g., hotel, restaurant, airport or the like). For example, if cities and airports are specified, lower zoom levels are used than if hotels and restaurants are specified.

At step 508, if a radius value is specified in the user's input query, the zoom level is determined as a function of the radius. The zoom level will ensure that the map displayed is slightly larger than a circle having the radius, so that items at the edge can be displayed.

At step 510, the appropriate zoom level is selected.

At step 512, once the map server 406 knows the center point of the map to be displayed, it uses the Yahoo! map server to generate a correct map image of that area with the correct zoom level. To do so, the map server would need to provide an address for the center point of the map.

At step 513, an array may be input containing identification of the types of items to be displayed on the map. In some embodiments the array is input graphically by a set of checkboxes that are checked or unchecked by the user. In other embodiments, the user can input the item types using text entry. In other embodiments, they are saved locations.

At step 514, the mapping application 400 queries the one or more search engines 404 for data items matching the user's filtering criteria and geographic constraints. These data items are initially loaded from the content database into the search engine.

At step 516, items returned from the queries to each search engine 404 are combined into one result set. For each item in the result set, the mapping application 400 translates the latitude and longitude information to a Cartesian (x, y) pixel coordinate. This information allows the correct placement of the item's icon on the map image. This is essentially a geometric transformation.

At step 517, the mapping application 400 generates a response to the web browser 412 containing the map image, the data items with their pixel coordinates and the rest of the user interface components. The user is then able to interact with the system by initiating another request to the mapping application.

For example, at step 518, if at least one icon is selected, step 520 is performed.

At step 520, if only one icon is selected, then at step 522, the interface application jumps to another web page linked to the icon. (In some embodiments, the user must click on a button in addition to selecting the icon to cause the jump, or a double-click may be used to cause the jump).

At step 520, if two icons are selected, then at step 524, the distance between the two locations and/or travel information is displayed.

If no icon is selected at step 518, but the user hovers the cursor over one of the icons at step 526, then at step 528 a summary of information about the selected landmark or attraction is displayed.

Figure 6:
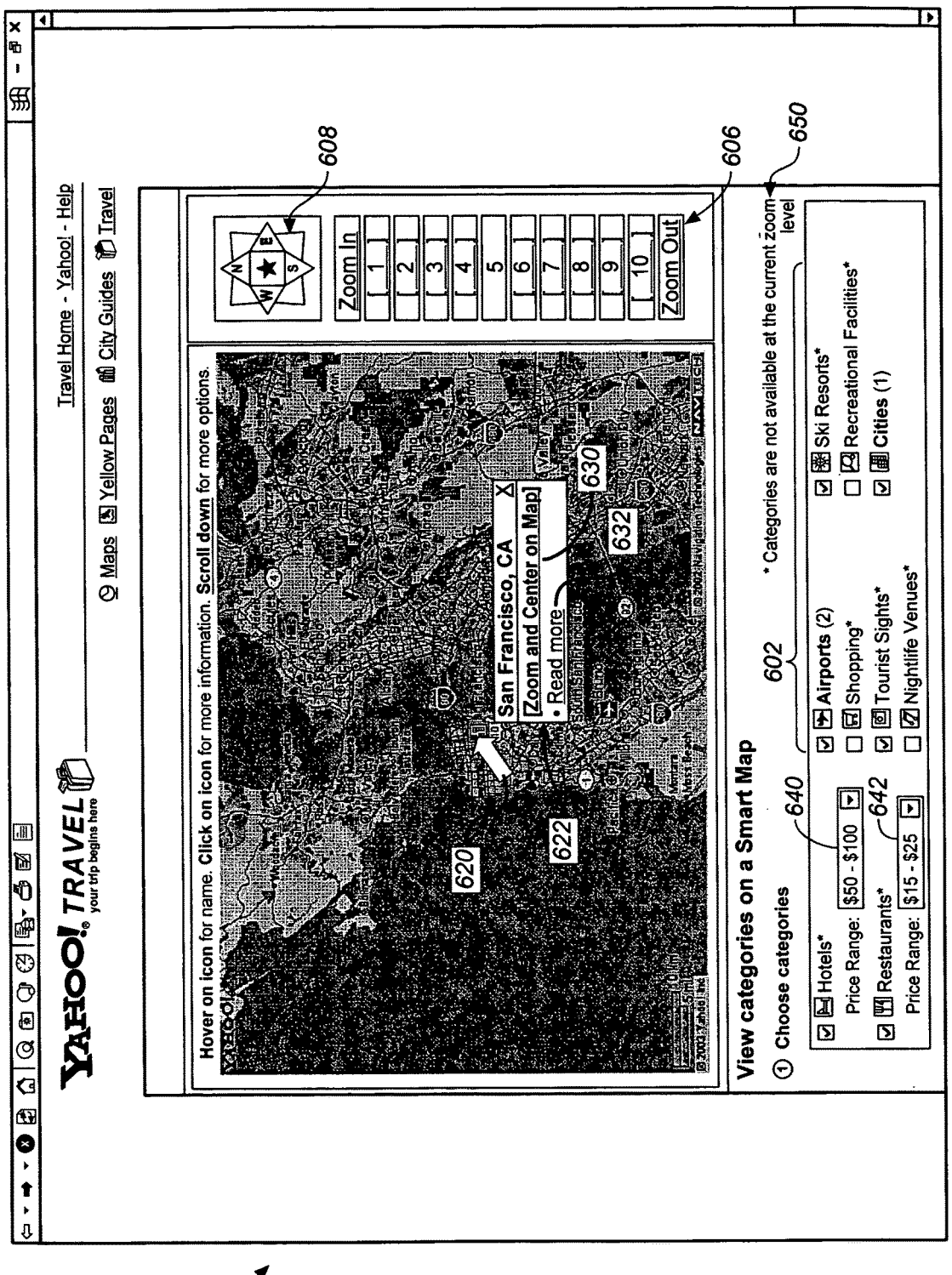
FIG. 6 shows a maps generated by the system of FIG. 4, with information displayed in response to placing the cursor over a city.

FIGS. 6-13 show another embodiment that provides additional options from which the user can make selections. In FIG. 6, the map 600, zoom controls 606, pan controls 608, and cursor 620 are the same as respective items 100, 106, 108 and 120 in FIG. 1, and a description thereof is not repeated.

In the user interface of FIGS. 6-13, the hotel and restaurant fields include drop-down boxes 640 for hotels and 642 for restaurants, from which the user can select a price range for each item type. In some embodiments, the price ranges are in discrete bands (e.g., for hotels, $0 to $50, $50 to $100, $100 to $200, $200 to $500, or more than $500), so that selection of each range causes display of completely different items. In other embodiments, each range has the same minimum value (e.g., for restaurants, $15 or less, $25 or less, $50 or less, all).

Figure 11:
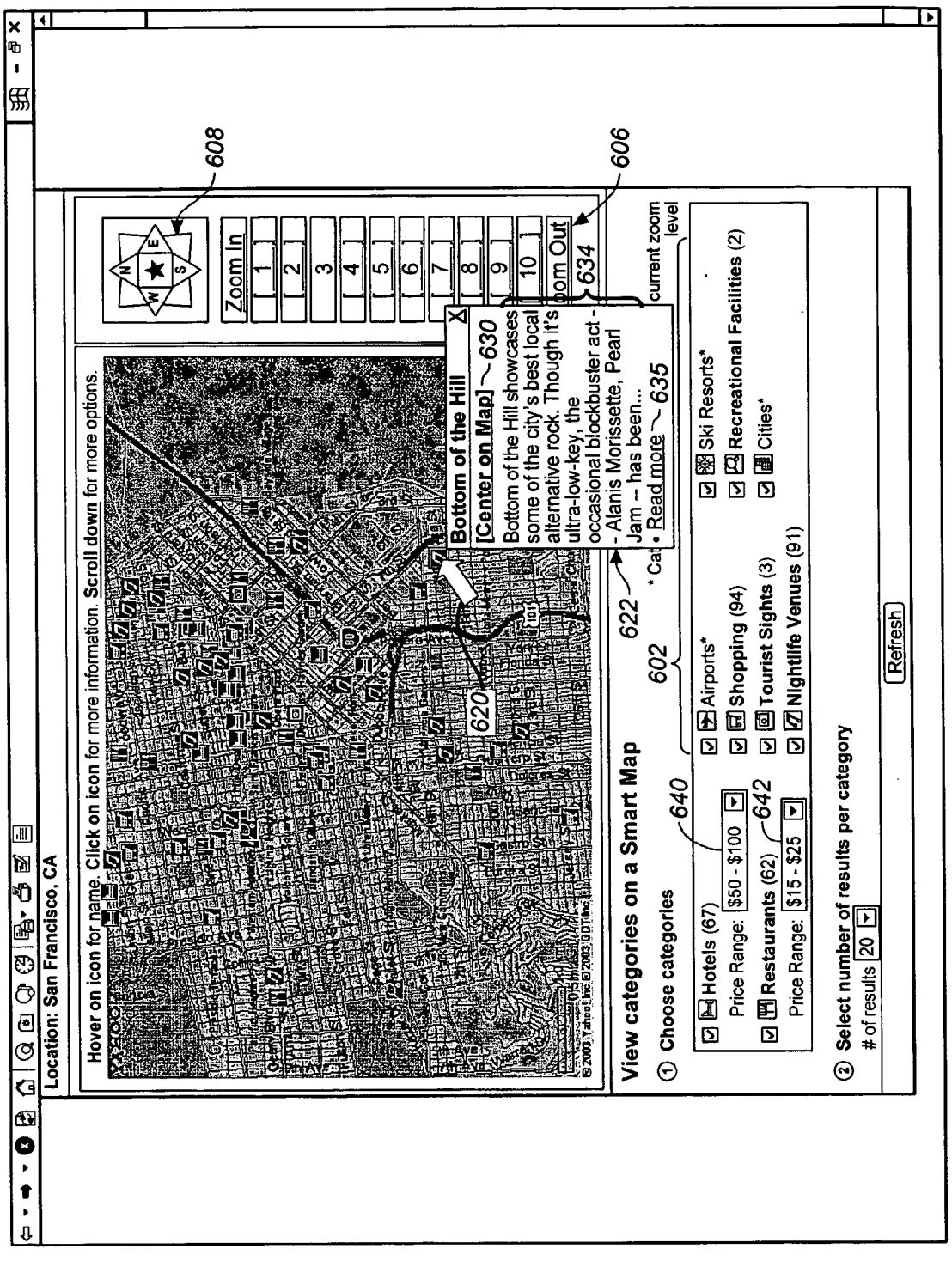
FIG. 11 shows a maps generated by the system of FIG. 4, with information displayed in response to placing the cursor over an entertainment venue.

In this embodiment, a note 650 with an asterisk (*) appears in the display indicating that "Categories are not available at the current zoom level." The asterisk automatically appears next to each attraction category (e.g., hotels, restaurants, shopping, tourist sights, nightlife venues, ski resorts and recreational facilities in FIG. 6) that is not currently displayed due to the current zoom level. The categories for which the asterisk is displayed automatically are updated each time the "Refresh" (or "Update") button shown in FIG. 11 is selected.

In the example of FIGS. 6-13, when the cursor 620 hovers over an icon, the name of the item is displayed, and an information box 622 containing additional information only appears when the item is selected. In each of FIGS. 6-13, a respectively different type of item is selected, and corresponding information is displayed.

In FIG. 6, a city icon is selected. The name of the city is displayed, along with two command lines 630 and 632. If the "Zoom and Center on Map" command 630 is selected, then a new map is displayed with a different center point and a different zoom level. If "Read More" 632 is selected, then a travel page for that city is visited. The travel page may include such information as recommended sights, attractions, and restaurants, travel information, and additional hyperlinks to web sites with more detailed information on specific subjects (e.g., hotel, restaurants, attractions, events, and the like).

Figure 7:
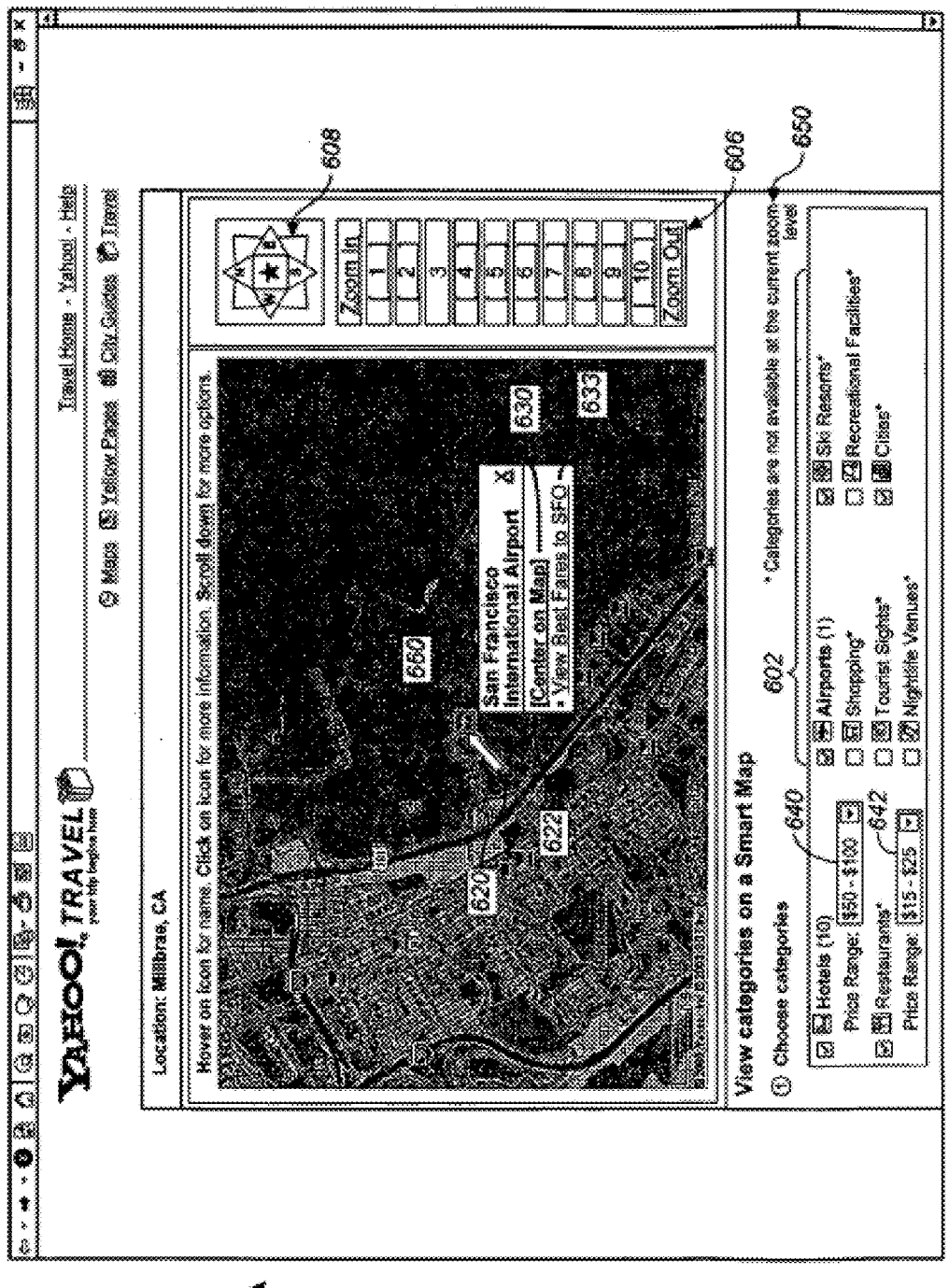
FIG. 7 shows a maps generated by the system of FIG. 4, with information displayed in response to placing the cursor over an airport.

FIG. 7 shows the map 600, when an airport icon 660 is selected. In addition to the "center icon," 630 a link 633 is provided to a web page displaying the best airfares currently available to reach the selected airport from several major cities.

Figure 8:
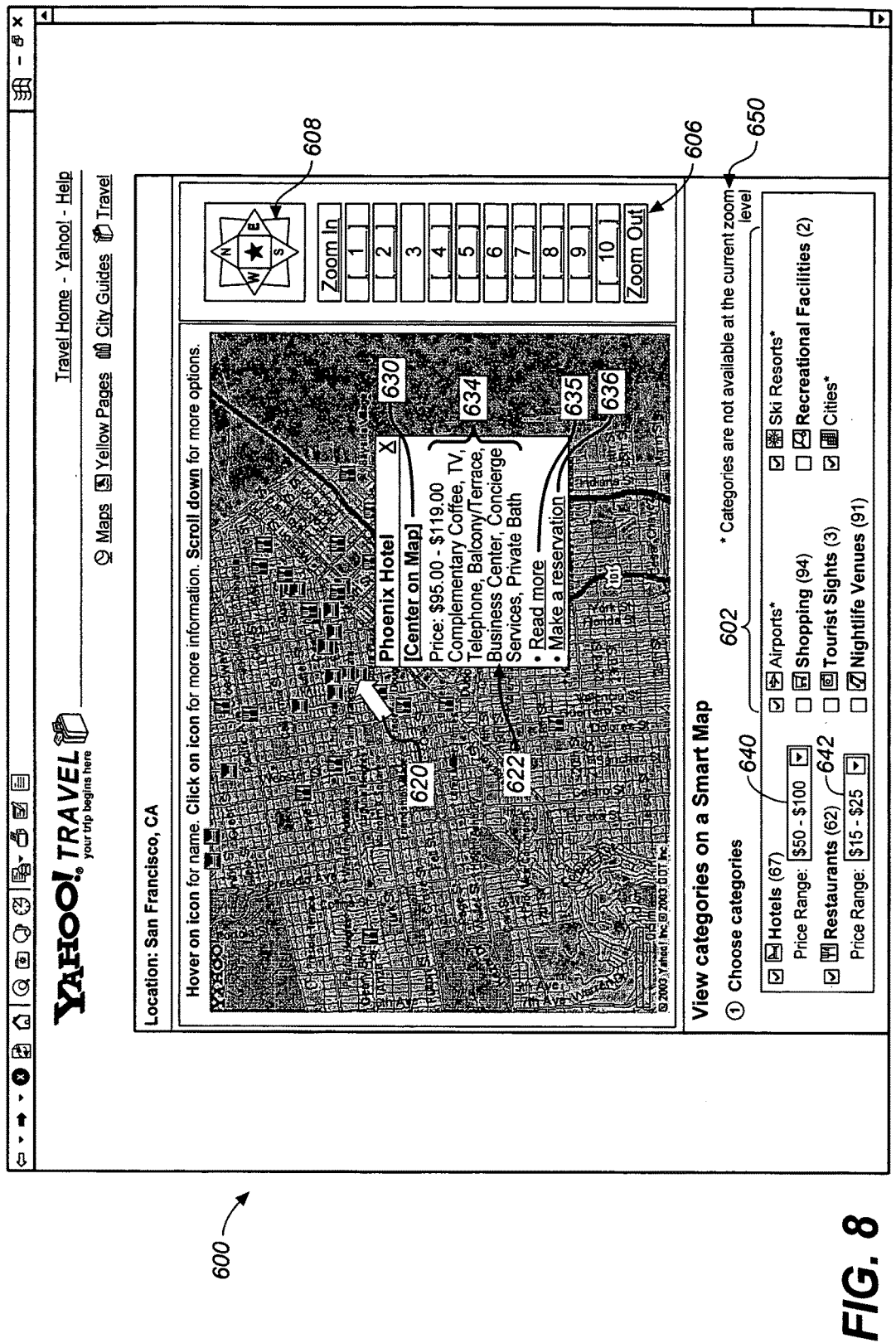
FIG. 8 shows a maps generated by the system of FIG. 4, with information displayed in response to placing the cursor over a hotel.

FIG. 8 shows the map 600, when a hotel is selected. In addition to the "center icon," 630 a summary 634 of the hotel is provided. The information box 622 also includes a link 635 to view additional information, and another link 636 to make a reservation at the hotel.

Figure 9:
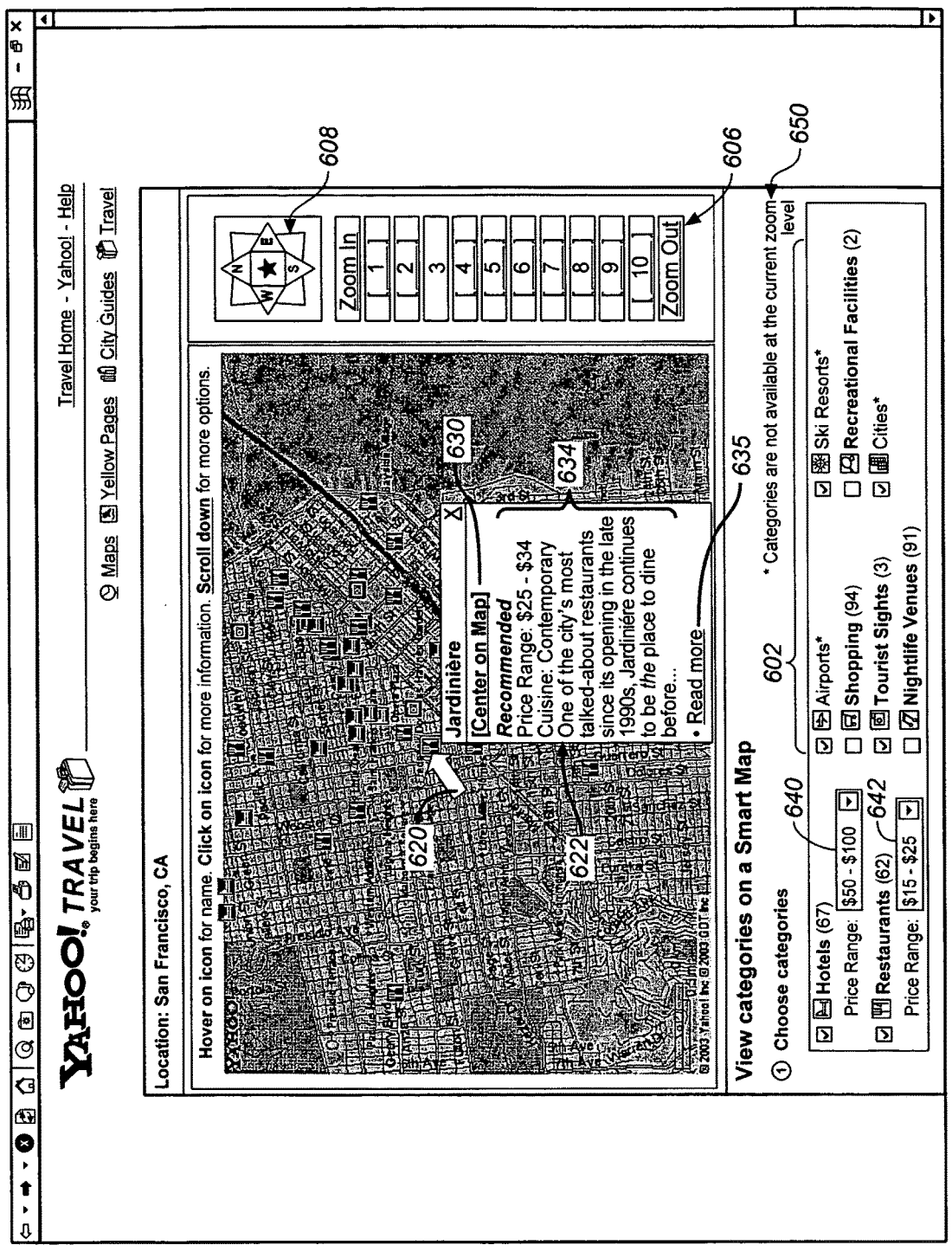
FIG. 9 shows a maps generated by the system of FIG. 4, with information displayed in response to placing the cursor over a restaurant.

FIG. 9 shows the map 600, when a restaurant is selected. In addition to the "center icon," 630, a summary 634 of the restaurant is displayed, and a link 635 is provided to read more information about the selected restaurant.

Figure 10:
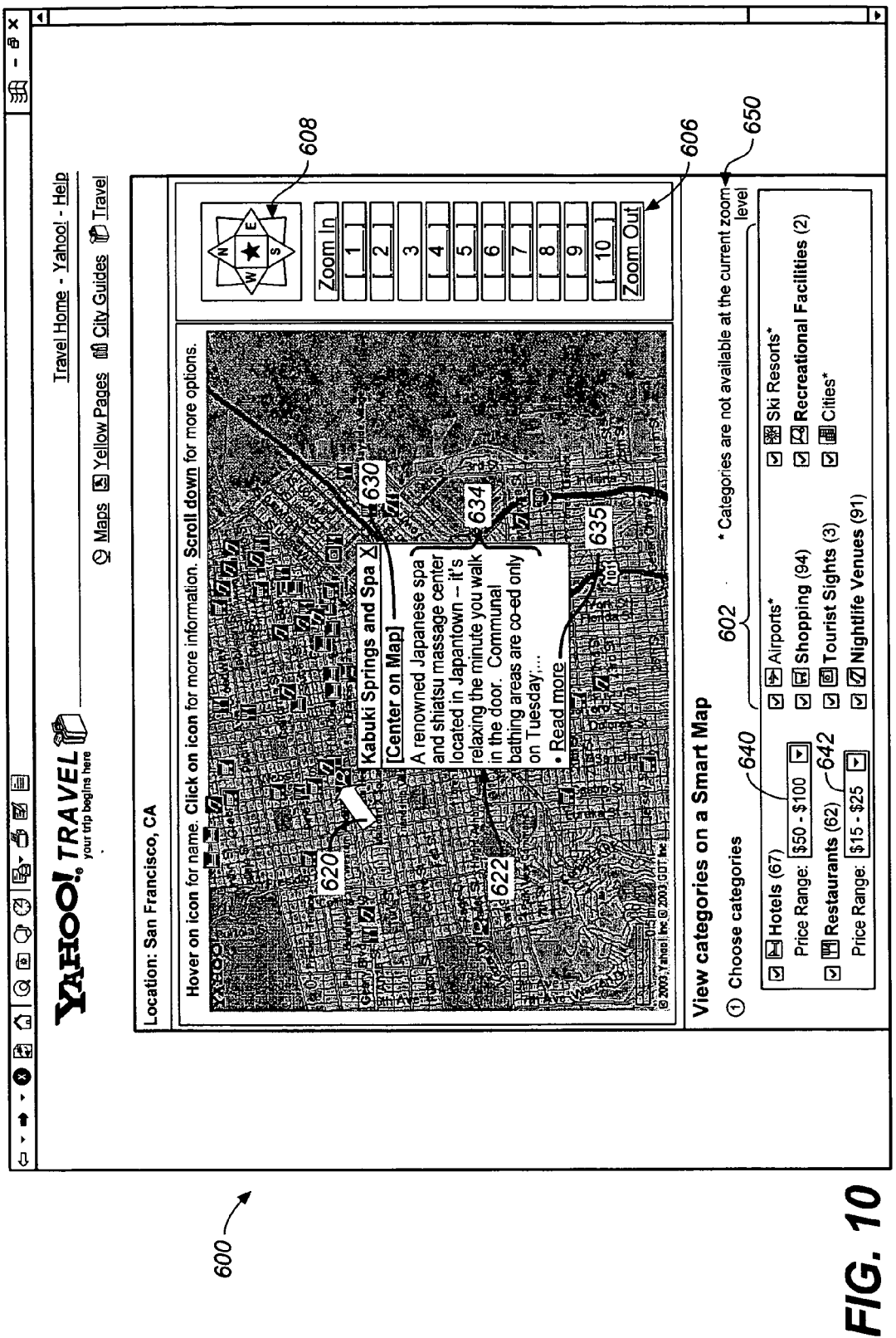
FIG. 10 shows a maps generated by the system of FIG. 4, with information displayed in response to placing the cursor over a recreational facility.

FIG. 10 shows the map 600, when a recreational facility is selected. In addition to the "center icon," 630, a summary 634 of the restaurant is displayed, and a link 635 is provided to read more information about the spa.

FIG. 11 shows the map 600, when an entertainment venue is selected. In addition to the "center icon," 630, a summary 634 of the restaurant is displayed, and a link 635 is provided to read more information about the night club.

Figure 12:
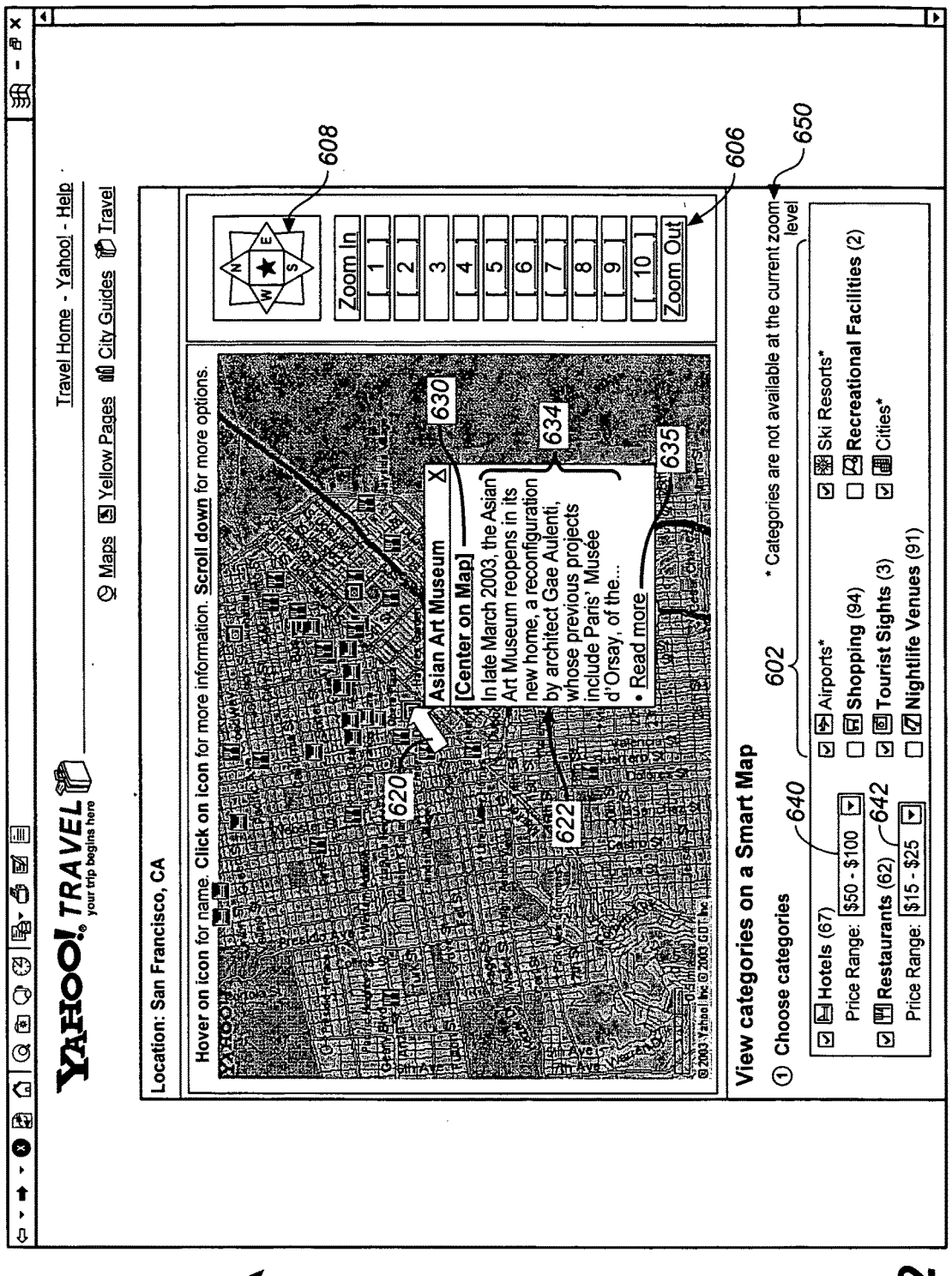
FIG. 12 shows a maps generated by the system of FIG. 4, with information displayed in response to placing the cursor over a museum.

FIG. 12 shows the map 600, when a museum is selected. In addition to the "center icon," 630, a summary 634 of the restaurant is displayed, and a link 635 is provided to read more information about the museum.

Figure 13:
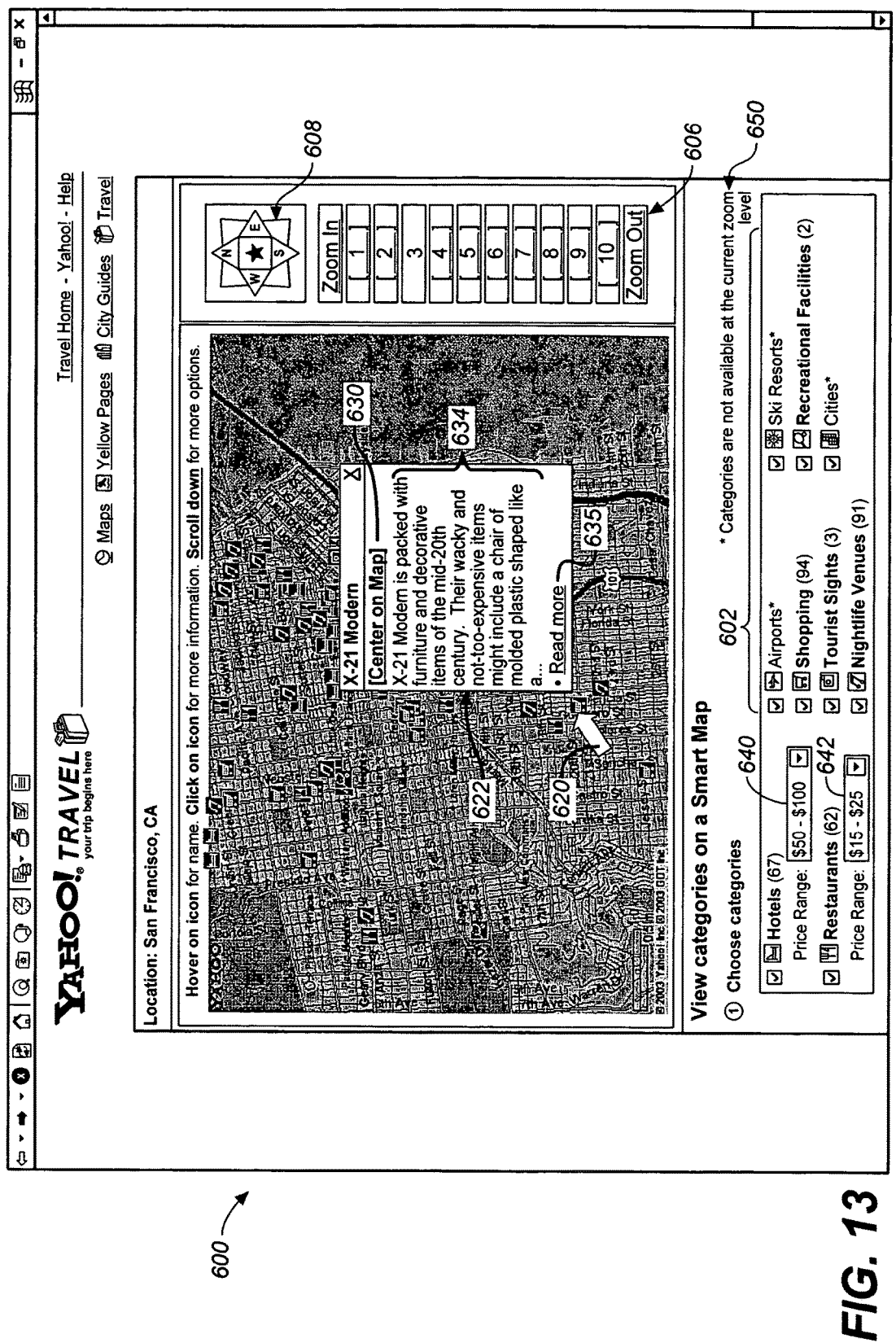
FIG. 13 shows a maps generated by the system of FIG. 4, with information displayed in response to placing the cursor over a store.

FIG. 13 shows the map 600, when a store is selected. In addition to the "center icon," 630, a summary 634 of the restaurant is displayed, and a link 635 is provided to read more information about the store.

One of ordinary skill in programming can readily select the appropriate type of information to be made available for other types of items.

Figure 14:
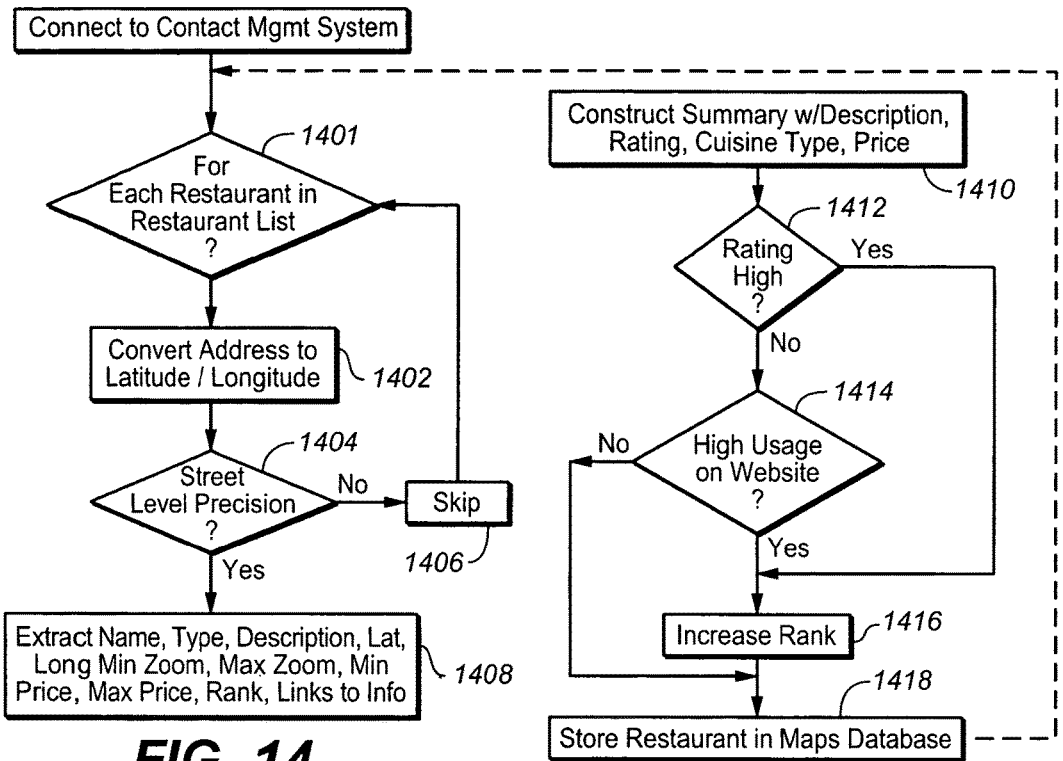
FIG. 14 is a flow chart showing an example for generating a map containing restaurants.

FIG. 14 is a flow chart diagram showing details of another example, for generating maps of restaurants. This is only one example of how the capabilities of the mapping software described herein may be tailored to provide specialized features for a particular type of item.

At step 1400, the process begins by connecting to a source of restaurant information, such as an automated contact management system. Other sources of restaurant listings, such as an electronically formatted yellow pages directory, or commercial search engine databases may be used.

At step 1401, a loop of steps 1402-1418 is performed over all restaurants in the contact management system (or other restaurant list), to prepare them for submission to the search database.

At step 1402, the address of the current item is converted to a latitude and longitude, for example, using a geocoder as described above. The geo coder is responsible for converting an address to latitude and longitude. In a preferred embodiment, the geocoder also supplies a measure of the precision with which the address is converted.

At step 1404, a determination is made whether the precision determined at step 1402 is at least street-level precision so that the item can be displayed at the correct street level detail. If the precision is at least street-level, then step 1408 is executed. If the precision is less than street level detail, step 1406 is executed.

At step 1406, the program skips to the next restaurant if the correct precision is lacking. This is based on the assumption that for restaurants, only items that are converted with street level precision should be entered in the database.

Many restaurant patrons would be unable to find a restaurant if lesser precision is provided.

At step 1408, the system extracts all the information need for populating the search engine. This may include:

NAME—for display purposes
TYPE—to display the correct icon and allow filtering
DESCRIPTION—for display purposes
LAT/LONG—latitude and longitude of the item so that
1) the search engine can perform geographical queries
2) the icon can be placed at the correct location on the map
ZOOM HI/LOW—the zoom levels where this item should be visible on the map
MIN/MAX PRICE—the price for this item to allow filtering on price
RANK—a number that is used for prioritizing the display of items when there are more items to display on a map than there is room.
OID—unique contact management system identifier for this object for linking to other information about this item.

At step 1410, the system constructs a summary description of the item by considering:
(a) the editorial review of the item;
(b) whether it has received a top-pick rating;
(c) the cuisine of the food served at the restaurant; and
(d) the price range of the restaurant.

In some embodiments, the system blends ratings from multiple sources (e.g., ratings from Yahoo! users and ratings from other editorial sources). An exemplary system blends varying editorial and users' ratings from multiple sources into one unified rating score, using standardized scoring. In a preferred embodiment, the editorial reviews are given a higher weight than the user reviews.

At step 1412, a determination is made whether the restaurant is recommended (for example, by a restaurant critic, or a service such as "ZAGAT™". If the restaurant has a high rating, then step 1416 is executed. Otherwise, step 1414 is executed.

At step 1414, a determination is made whether the restaurant has a high usage on the website (i.e., the restaurant is the subject of a high number of queries.) If there is a high web site usage, then step 1416 is executed. Otherwise, step 1418 is executed.

At step 1416, the rank of the restaurant is increased.

At step 1418, the item is stored in the search database.

One of ordinary skill can readily construct customized applications for other specific item types, to increase the functions available for displaying those item types.

Figure 15:
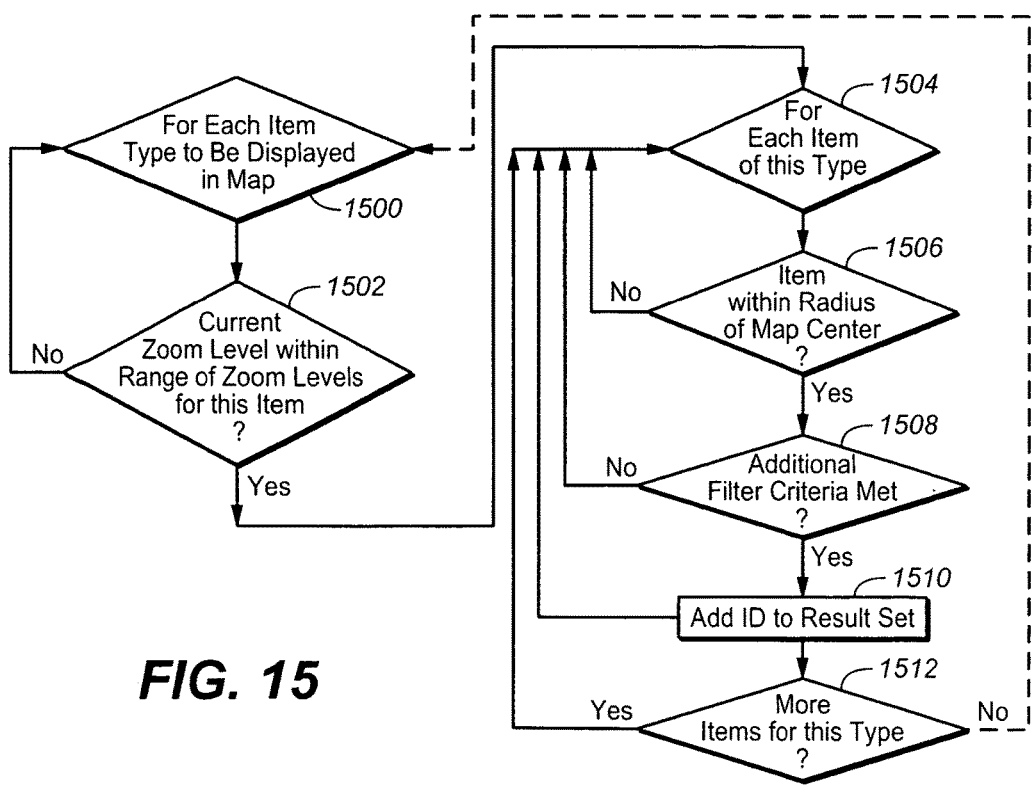
FIG. 15 is a flow chart diagram of the process of filtering items to be displayed on the map.

FIG. 15 is a flow chart diagram showing details of the querying process.

At step 1500, a loop of steps 1502-1512 is executed for each type of item to be displayed on the map. For example, this loop may be repeated for every item type having a checked checkbox, as shown in FIG. 1.

At step 1502, a determination is made whether the current zoom level is within the range of allowable zoom levels for the current type of item. As noted above, each item has a minimum zoom and a maximum zoom level. For example, in some embodiments, display of restaurants may be limited to zoom levels showing street level detail. If a map is being displayed at a zoom level where the finest detail is a city, then the current zoom level would be outside of the range for display of restaurants, and restaurants inside the current radius would not be displayed. In preferred embodiments, a message is displayed if the current zoom level lies outside of the range of allowable zoom levels associated with a type of item selected for display. This alerts the user that the absence of this type of item on the map is not an indication that there are no items of this type within the current map radius. If the current zoom level is outside the range for this item type, then the loop returns to step 1500 for the next type of item.

At step 1504, the loop of steps 1506-1512 is executed for each item within the current item type. The system can check each item in the database, and only further consider the items for which the type attribute matches the current type.

At step 1506, a determination is made whether the item is located within the current radius of the center of the map. In some embodiments, the current radius is a function of the current zoom level. In other embodiments, the current radius may be either an optional filter criterion or a mandatory input parameter entered by the user. If the item is located outside of the current radius, then the item is not added to the map, and the loop returns to step 1504 for the next item of this type. If the item is within the current radius, then step 1508 is executed.

At step 1508, a determination is made whether the current item satisfies any additional filtering criteria that the user may have selected to be displayed in the map. In some embodiments, such as travel information mapping programs, or shopping information programs, the additional filtering criteria may include distance from the center of the map, distance from another selected item, or price range. However, filtering criteria based on attributes associated with any of the item types may be used.

For example, in a restaurant information application, the user may be provided the ability to filter and only display restaurants that have received a predetermined minimum level of approval from a reviewer in one or more categories from the group including food quality, service, or ambiance. Within the restaurant type, subcategories may also be established, such as the cuisine, and the user may be able to filter restaurants to only display those restaurants serving a particular cuisine, such as, for example, Indian food.

Other filtering criteria may be tailored to each application and item type. For example, in a real estate application, the user may be provided the ability to display only school districts in which the average scholastic aptitude test score exceeds a threshold level.

If all of the filtering criteria selected by the user are met, then step 1510 is executed. Otherwise, the next item is considered beginning at step 1504.

At step 1510, the item is added to the list for display on the map.

At step 1512 a determination is made whether there are more items for this type to be evaluated. If there are more items, then the loop of steps 1504-1512 is repeated. If there are no more items of this type, then step 1500 is executed, to begin the loop for the next item type.

Figure 18:
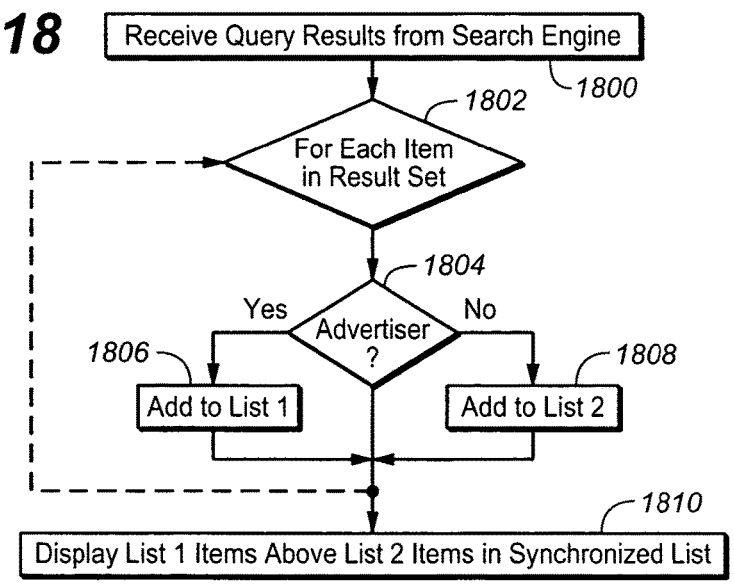
FIG. 18 is a flow chart diagram of an exemplary method for including sponsor or advertiser information in a synchronized list.

FIG. 18 is a flow chart of an exemplary method for organizing the synchronized list to separate advertisers from non-advertisers.

At step 1800, a set of search results are received from a search engine.

At step 1802, a loop is executed for each of the items in the search result set.

At step 1804, a determination is made whether the item corresponds to an advertiser or not. If the item corresponds to an advertiser, step 1806 is executed. If not, then step 1808 is executed.

At step 1806, the item corresponding to an advertiser is added to a first list.

At step 1808, the item corresponding to an advertiser is added to a second list.

At step 1810, the items in the first list are displayed above the items in the second list. This may include listing items separately by category, and within each category, displaying the items from the first list above the items from the second list, so that the list is divided into twice as many sections as the number of categories.

Figure 19:
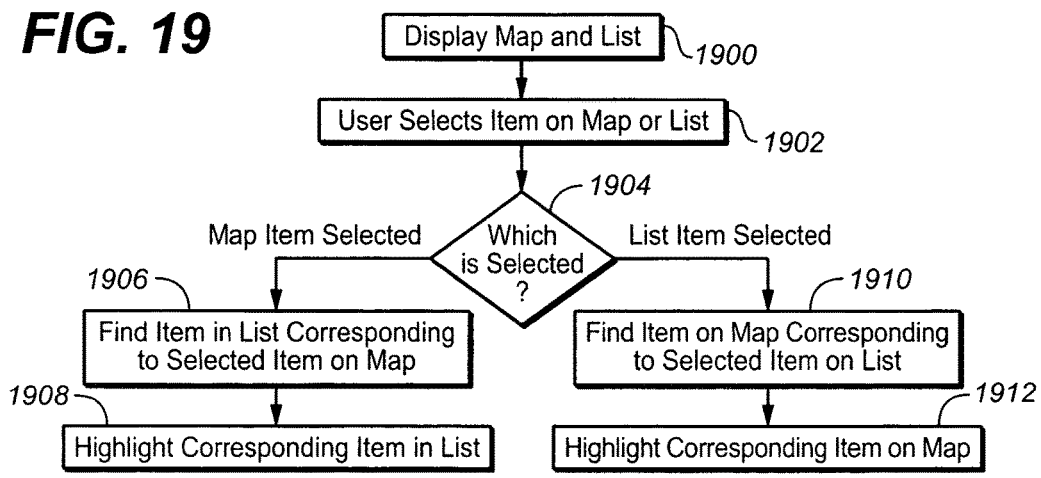
FIG. 19 is a flow chart diagram of an exemplary method for synchronized mapped icons and a list of the corresponding items.

FIG. 19 is a flow chart diagram showing an exemplary means for generating a synchronized list. At step 1800, a corresponding map and list of the items on the map is displayed.

At step 1902, a user selects an item on the map or an item on the list by, for example, clicking on the item or holding the cursor over the item.

At step 1904, a determination is made whether the selected item is an icon on the map or an item on the list. If an icon on the map is selected, step 1806 is executed. If an item on the list is selected, then step 1910 is executed.

At step 1906, the items on the list are searched, until the item is found which corresponds to the selected icon on the map.

At step 1908, the matching item on the list is highlighted (e.g., by reverse video and/or larger font and/or different font and/or different color from other items on the list).

At step 1910, the icons on the map are searched, until the icon is found which corresponds to the selected item on the list.

At step 1912, the matching icon on the map is highlighted (e.g., by different icon and/or different color from other items on the list, and/or larger icon size).

Although selection devices are discussed above, all of the above described functions may be done using voice activation.

Although browser based user interfaces are described above, the above described functions may be implemented for use with an alternative user device, such as, for example, a personal digital assistant, which may provide wireless internet access.

Figure 20:
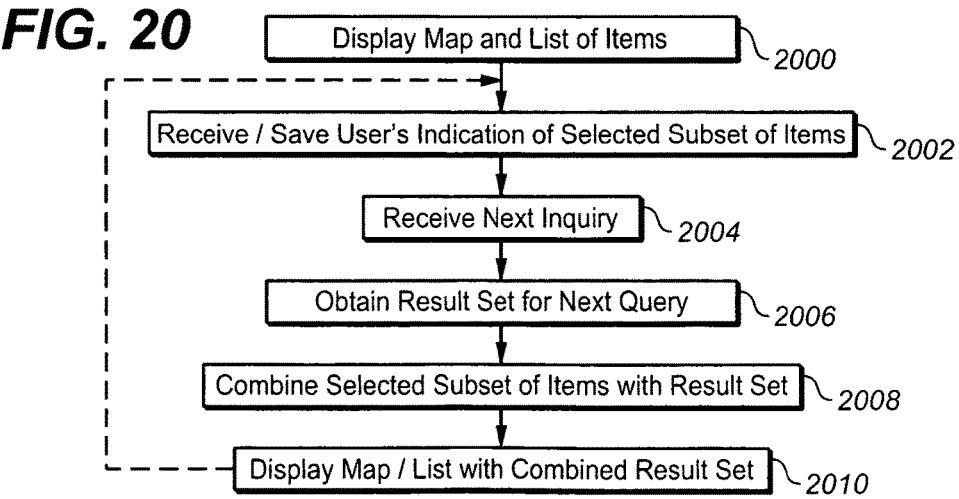
FIG. 20 is a flow chart diagram of an exemplary method for customizing the query results to include items selected by a user.

FIG. 20 is a flow chart diagram of an exemplary method for providing user interaction to customize the search result list.

At step 2000, an initial result set is displayed containing the results of a query. The result set is displayed so as to provide a means for enabling a user to select at least one item for continued display. For example, checkboxes as shown in FIG. 16, or other controls may be displayed adjacent to the items on the synchronized list.

At step 2002, a user's selection of a subset of the displayed items is received, for example by way of checkboxes checked by the user. Identification of the items in the subset is saved.

At step 2004, the user makes a new query.

At step 2006, a next result set from the additional query by the user is received.

At step 2008, the subset of items selected by the user at step 2002 is combined with the result set of step 2006.

At step 2010, the combined result set (including the selected subset of items and the results of the most recent query) is displayed. Thus a means is provided for displaying the selected item(s) on the map simultaneously while displaying items found by a subsequent query, regardless of whether the at least one selected item satisfies a search criterion used in the subsequent query.

After step 2010, steps 2002-2010 may be repeated any number of times. During each iteration of this loop, the user can any of the currently displayed items to the selected subset for incorporation into the combined list, and can also delete any previously selected item in the subset (for example, but un-checking the corresponding checkbox).

In the above example of FIG. 20, the user's subsequent queries use defined criteria, such as category type, distance and the like described above. In other embodiments, a "More like this" feature is provided. When the user selects one or more points for continuous display, the user can submit a query requesting more items having similar attributes. For example, based on all of the categories and attributes to which a selected business belongs, those category and/or attribute names and location may be used as keywords to match related PFP listings.

Figure 21:
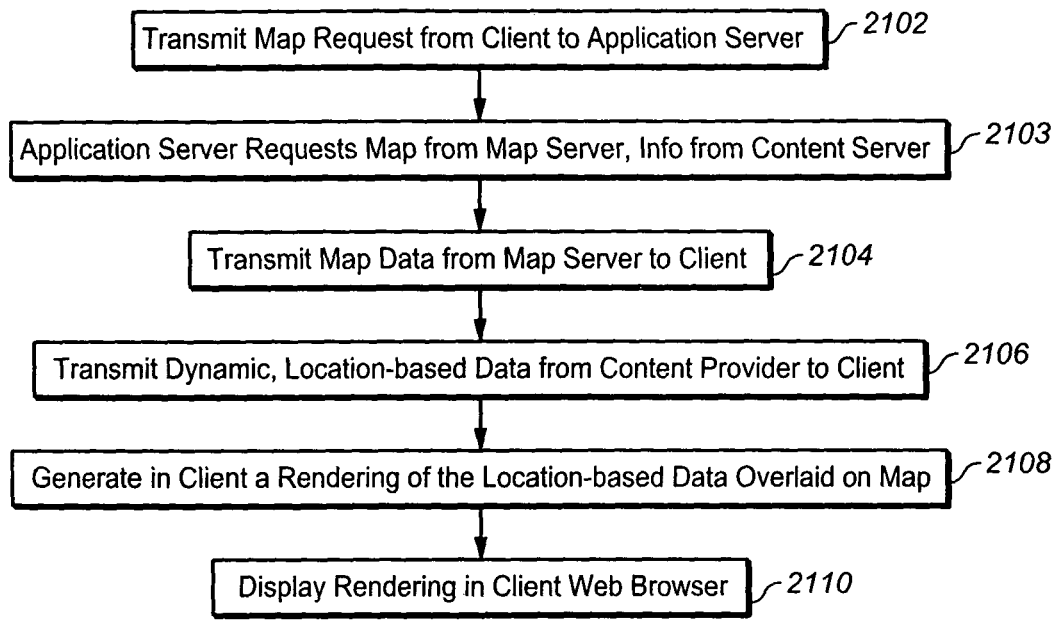
FIG. 21 is a flow chart diagram of an exemplary method for providing maps.

FIG. 21 is a flow chart diagram showing another feature of the exemplary embodiments. As noted above, the database may include dynamic, location based information such as traffic conditions, weather, environmental conditions, or the like. FIG. 21 shows an exemplary method which displays dynamic, location-based data. Location-based data include parameters and attributes that are functions of location (or location and time). Dynamic, location-based data include parameters and attributes that are functions of both location and time.

At step 2102, the client computer transmits a map request to an application server. The map request may be initiated when, for example, the user clicks on a link or button on a web page rendered by an application server, in order to request a map, or enters a text based request.

At step 2103, the application server requests map data from a map server and location-based information from a content server. If the location-based information is provided in a format other than latitude-longitude coordinates (e.g., if street addresses or intersections are provided), a geocoder 408 (FIG. 4) may be used, as described above. In some embodiments, the application server, content server and map server are located in a single host computer. In other embodiments, the map server and/or the content server are located in one or two separate computers, other than the computer hosting the application server. In other embodiments, the map data may be Akamaized, using a plurality of distributed map servers and a content distributor that redirects the map data request to the one of the map servers that is closest to the recipient.

At step 2104, the application server transmits the map data from the map server to the client, and the client receives the map data.

At step 2106, the application server transmits the dynamic, location-based data from the content provider to the client, and the client computer receives the dynamic, location-based data from the content provider separately from the data representing the map. The application server can transmit the map data and the location-based data sequentially, or in parallel streams. Either way, the map data cover a complete map, including the areas that will subsequently be obscured when the location-based data are overlaid on the map.

At step 2108, the client computer assembles the various data streams (map, dynamic, location based data) and generates a rendering of the dynamic, location-based data overlaid on the map. The application server sends a plurality of different images and instructs the client to overlay them on top of each other in a particular order, so that the location-based information appears on top of the map. In addition, if two or more types of location-based data are to be overlaid on the map, a predetermined front-to-back order is used, so that if two types of location-based data values are provided at a given point, a predetermined one of the types of location-based data is always shown on top. For example, in a display of traffic data including vehicle speed and construction/traffic-incident indicators, the construction/ traffic-incident indicators may be selected to always appear on tope of the speed indicators, so that construction and accident locations are readily visible on the map.

At step 2110, the client computer displays the rendering. The rendering is displayed with icons representing the traffic data on the map at map locations corresponding to the locations represented by the icons.

By allowing the assembly of information to occur in the browser of the client computer, it is possible to overlay interactive icons on the map, for example using HTML.

The exemplary system also allows rapid updating of maps that contain overlaid dynamic data. For example, upon client browser refresh, updates to the dynamic, location-based data can be downloaded from the content server to the application server, and then to the client, and overlaid onto the previously downloaded map data, without requiring a retransmission of the map data. Only the dynamic overlaid data needs to be updated. This is particularly efficient, because the map data comprises a substantially larger number of bytes than the location-based data. The map data would only need to be replaced to change zoom levels, pan, or start a new map.

Figure 22:
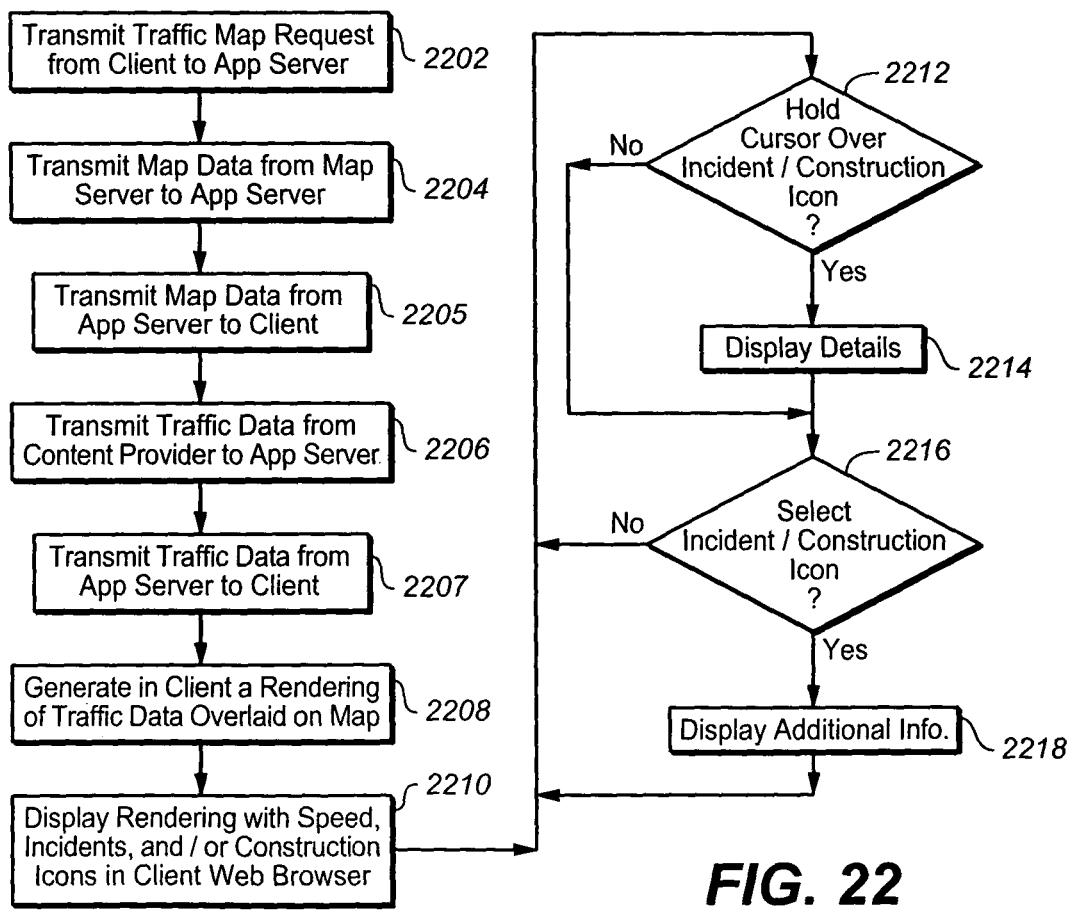
FIG. 22 is a flow chart diagram of an exemplary method for providing maps with traffic data.

FIG. 22 is a flow chart diagram of a specific embodiment of the method of FIG. 21, for providing dynamic, location-based data that include traffic data.

At step 2202, the client computer transmits a map request to the application server. The application server requests map data from a map server and traffic information from a content server. The traffic content server may be of a type shown and described in U.S. Pat. No. 6,317,686, which is incorporated by reference herein in its entirety. The content server provides updated traffic data to the application server, either on a periodic schedule, or upon the occurrence of a predetermined event (e.g., car accident, road closure, etc.), or as a combination of the two. In a preferred embodiment, the content server provides at least the following information: the average speed of vehicles at a plurality of points, locations of road construction work, and locations of traffic incidents. The location can be uniquely specified by latitude and longitude, so each speed value can be designated by a latitude-longitude-speed triplet. Other optional information may include, for example, road surface conditions.

If the traffic feed identifies the location of each latitude-longitude-speed triplet with sufficient precision, then it is not necessary to identify the direction of travel. Because the locations of roads are static and known, the location of any given point will determine the correct side of the road for which the vehicle speed is being provided. Based on whether autos drive on the right side of the road (e.g., in the U.S.) or the left side (e.g., U.K.), the direction of the traffic can be determined from the latitude and longitude. In other embodiments, the traffic feed may use an alternate format for specifying the location of each point, such as specifying an intersection. In such embodiments, a geocoder as described above can provide the application server with the latitude and longitude of each point.

In some embodiments, the application server, content server and map server are located in a single host computer. In other embodiments, the map server and content server are located in one or two separate computers, other than the computer hosting the application server.

At step 2204, the application server receives the map data feed from the map server.

At step 2205, the application server transmits the map data to the client. The client receives the map data.

At step 2206, the application server receives the traffic data from the content provider (traffic data feed).

At step 2207, the application server transmits the traffic data to the client, and the client computer receives the traffic data, separately from the data representing the map. The application server can transmit the map data and the traffic data sequentially, or in distinct parallel streams.

At step 2208, the client computer assembles the map and traffic data streams and generates a rendering of the traffic data overlaid on the map. The application server sends a plurality of different images and instructs the client to overlay them on top of each other in a particular order, so that the location-based information appears as interactive icons on top of the map. The map is at the back, with the traffic data on top thereof. Preferably, construction, incidents, or other events that disrupt traffic are overlaid on top of more routine indicators, such as speed indicators.

At step 2210, the client computer displays the rendering.

In the exemplary embodiment, the user of the client computer can interact with the icons representing the traffic information.

At step 2212, the user can hold the cursor of the pointing device over one of the icons, such as an icon representing a traffic incident or road construction. If so, then at step 2214, details of the traffic incident or road construction are displayed. If not, then step 2216 is performed.

Figure 23:
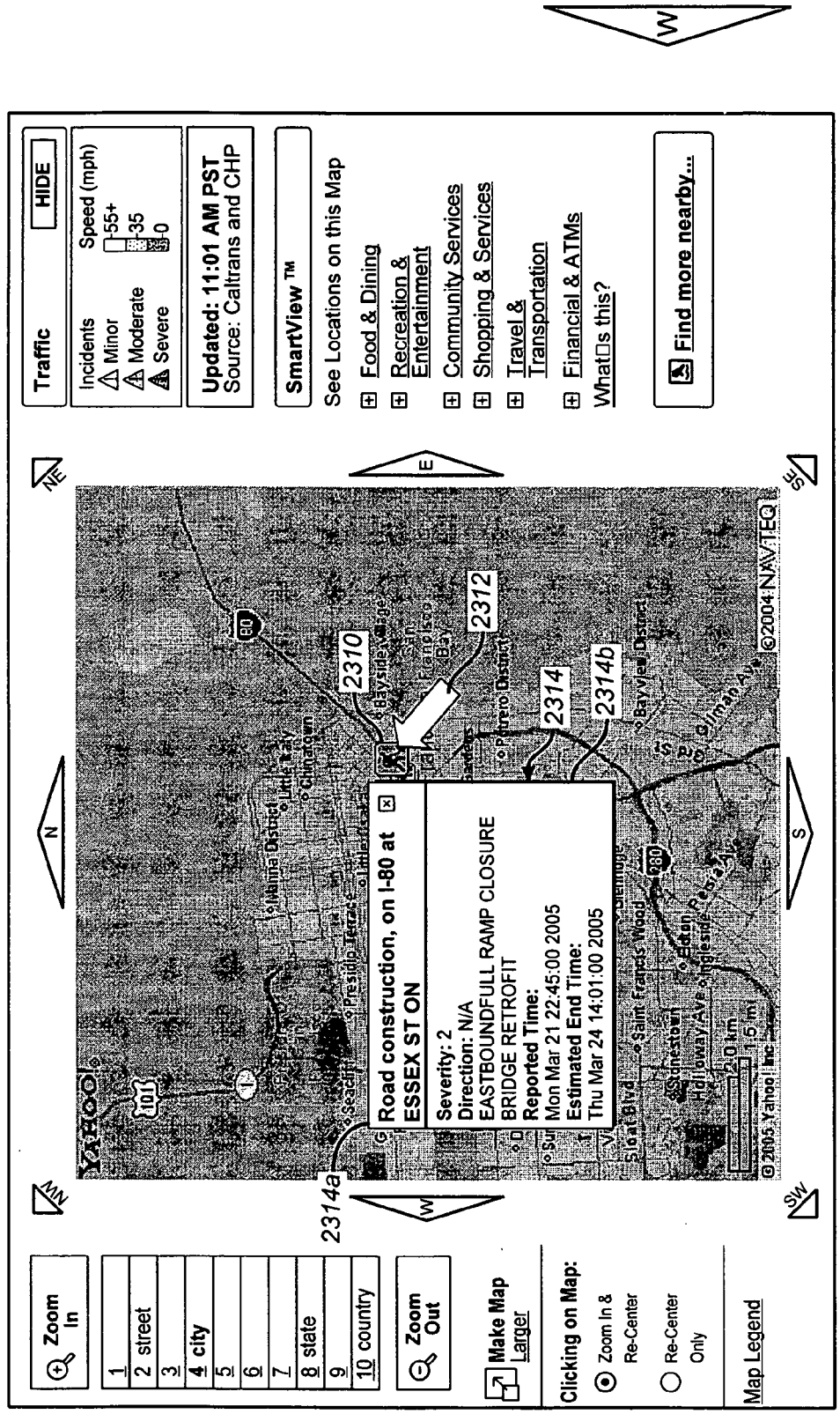
FIG. 23 is an exemplary display of a map with road construction data overlaid thereon.

FIG. 23 shows an example of a map 2300 containing a road construction icon 2310. When the cursor 2312 is held over the icon 2310, the summary textbox 2314*a* is displayed. The summary textbox 2314*a* at least includes the location of the construction.

Referring again to FIG. 22, at step 2216, if the user selects (i.e., clicks on) one of the icons, then at step 2218, full details of the road construction are displayed in an expanded text box 2314, including additional details 2314*b* (shown in FIG. 23).

In FIG. 22, after step 2216 and/or step 2218, steps 2212 to 2218 may be executed again as often as desired.

Figure 24:
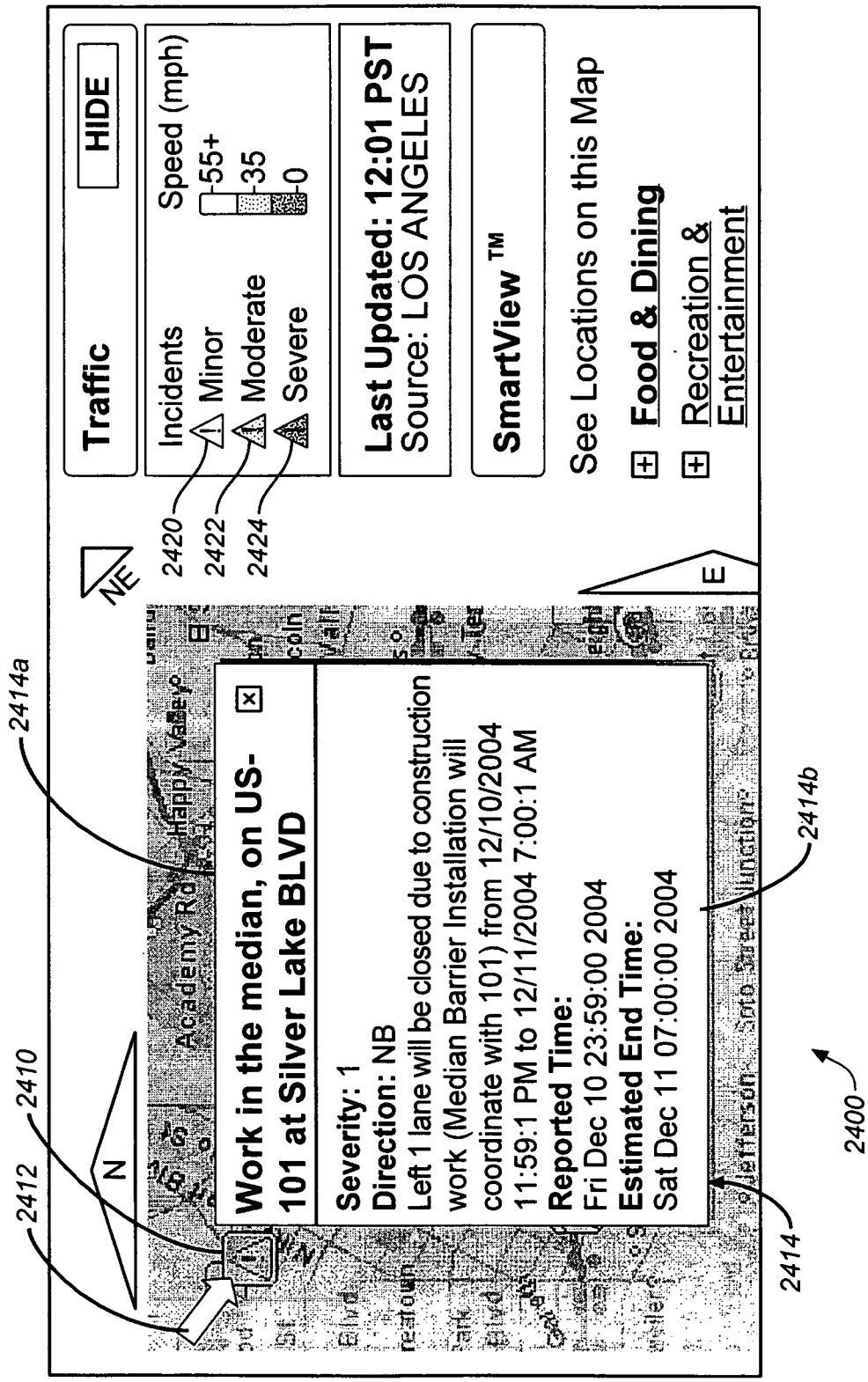
FIG. 24 is an exemplary display of a map with traffic incident data overlaid thereon.

FIG. 24 shows another example of a map display 2400, containing a traffic incident icon 2410. When the cursor 2412 is held over the icon 2410, the textbox 2414*a* is displayed. The textbox 2414*a* at least includes the location of the traffic incident. If the user selects (e.g., clicks on) one of the traffic incident icons, then full details of the incident are displayed in an expanded text box 2414, including additional details 2414*b*. Also shown in FIG. 24, the traffic incident icons may be color coded (or coded by distinct patterns) to indicate the severity of the incident. A legend including coded pictures 2420, 2422 and 2424 of the icons is displayed. For example, symbols 2420, 2422, and 2424 may be yellow, orange, and red, respectively.

Although exemplary text boxes 2314 (FIG. 23) and 2414 (FIG. 24) include location, severity, direction, reported time and estimated end time, other information may be displayed, and other formats may be used. For example, a description of the cause of the traffic disturbance may be included.

Figure 25:
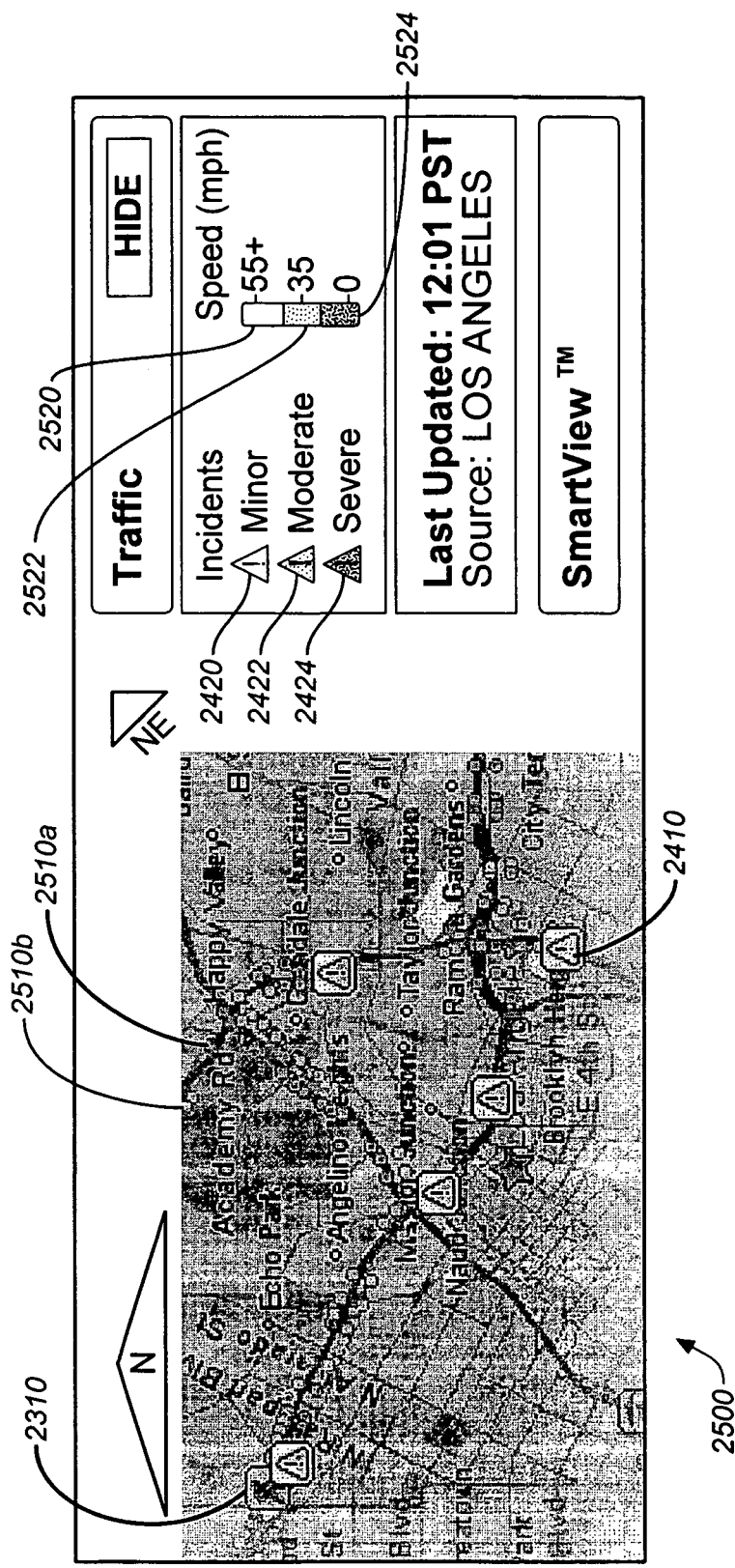
FIG. 25 is an exemplary display of a map with road construction and traffic incident icons and speed indicators overlaid thereon.

FIG. 25 shows the construction icons 2310, traffic incident icons 2410, and also speed indicators 2510*a* and 2510*b*. The speed indicators 2510*a*, 2510*b* indicate the average speed on a given section of a road, traveling in a given direction. For two-way roads and highways, the average speed on each side of the road may be indicated by respective indicators 2510*a*, 2510*b* on both sides of the road. The speed indicators 2510*a*, 2510*b* may have different colors, patterns or shapes to indicate different speed ranges. In the example, green indicators 2510*a* indicate speeds above 55 miles per hour, and yellow indicators 2510*b* indicate speeds of about 30 to about 45 MPH. Orange indicators may indicate very slow traffic, and red indicators (not shown)

may indicate jammed traffic. Other colors or patterns may be used, and any desired number of colors or patterns may be used for displaying speeds in a desired number of bands.

In the example of FIG. 25, the speed indicators 2510a, 2510b are shaped as circles. Circles have the advantage of being non-directional. Thus, circles can be overlaid adjacent to a road on a map based on the location of the traffic datum, without separately requiring an indication of the direction. Other shapes may be used for speed indicators 2510a, 2510b. If the speed indicators 2510a, 2510b are of a shape (e.g., arrows) indicating direction, then the client will need direction information to orient the shapes so as to point in the correct direction on the map.

In some embodiments, the speed indicators are not interactive, so that no function is performed when a speed indicator is selected. In some embodiments, the speed indicators 2510a, 2510b are interactive icons, and selecting (i.e., clicking on) one of the speed indicators 2510a, 2510b causes a display of the average speed value at that specific location, or the range of speeds over a short, immediately preceding period (e.g., the last 5 or 10 minutes). In other embodiments, selecting one of the speed indicators 2510a, 2510b causes the system to zoom in to the next higher level of magnification.

In other embodiments, instead of representing the speed indicators as dots on a map, they are represented as highlighting the parts of the road that they represent. So, visually they would appear like lines that are overlaid on top of the lines on the map. These overlaid lines may have a thickness that is the same as (or different from) the thickness of the lines on the map, with a distinctive color or pattern that is recognizable according to a legend that is displayed near the map. These embodiments may calculate, based on the traffic information, how long is it will take for a vehicle to reach its destination, or allow comparison and selection between one of two routes based on current traffic conditions.

Figure 26:
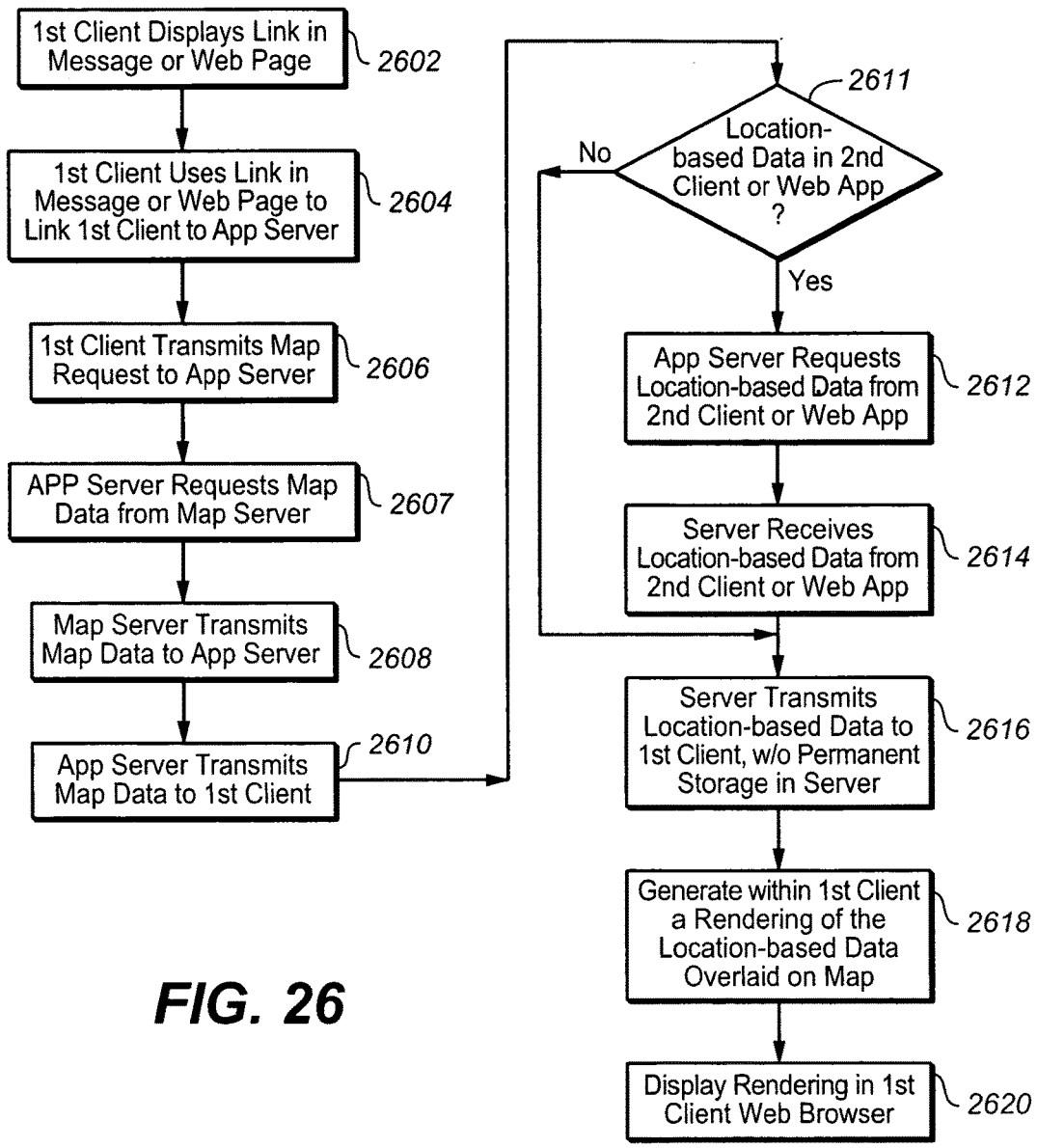
FIG. 26 is a flow chart diagram of a web service that allows a first client to display data located on a second client overlaid on a map.
Figure 27:
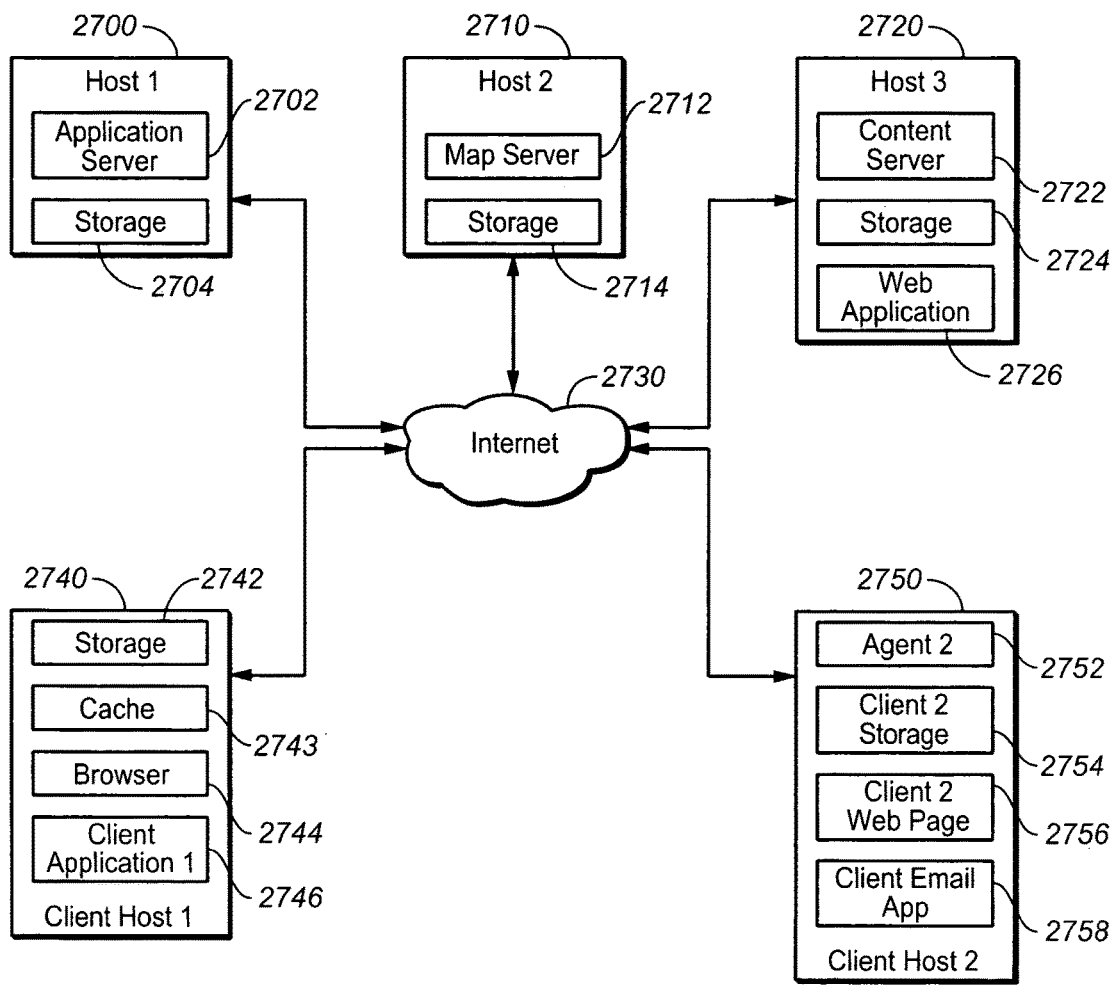
FIG. 27 is a block diagram of an exemplary system for practicing the method of FIG. 26.

FIGS. 26 and 27 show another variation of a method and architecture for one embodiment of the invention.

FIG. 27 shows a configuration in which at least three computers are hosts for servers in the system. Host 2700 contains the application server 2702 and a storage device 2704 for the mapping application software and, in some embodiments, data as well. The application server 2702 provides an interface for clients that use the mapping system, and coordinates the various data feeds, which may optionally be from sources external to the system. The application server generally performs the functions described above with reference to server 400 of FIG. 4.

Host 2710 contains a map server 2712 that provides maps of the requested cities at the requested (or calculated) zoom levels, and a storage device 2714 for the maps. Preferably, the map server 2712 is hosted in a separate computer from application server 2702, but this is not a requirement. The host 2710 may also contain the geocoder, for generating a latitude and longitude corresponding to any street address information that is provided.

One or more content servers 2722 provide the data content that is to be overlaid on the maps. Preferably, the content servers 2722 are hosted in one or more computers 2720 separate from the computer 2700 hosting the application server 2702, but this is not a requirement. This content may be any of the types described above, and may be stored in a local storage device 2724. The content may be provided by a plurality of servers. For example, tourist attraction data may be fed from a first server, traffic data from a second server, weather data from a third server, etc. The content server host 2720 may also contain a web application 2726 that provides users access to the mapping application by way of a different interface, as discussed further below.

The system in FIG. 27 also includes a plurality of clients. For example, client host 2740 may be a typical user of the mapping service, visiting the web site associated with the application server 2702, and requesting maps from the application server. These maps are then provided in the manner described above.

Client host 2750 may host personal web pages and/or store location-based data suitable for displaying on maps. In one variation of the method, the user of client host 2750 may wish to present his/her location-based data on a map for display by another user (e.g., a friend), such as the user of client host 2740. For example, the user of client 2750 may wish to share vacation descriptions of places visited or photographs taken at various locations, allowing friends to view a map with interactive icons overlaid on each location visited or at which a corresponding photograph was taken. Clicking on one of the icons causes display of the photograph taken at the location indicated by the icon and/or additional text and/or playback of audio information provided by the user of client 2750. This is just one example, and any type of location-based data may be used.

The exemplary application server 2702 allows the client 2740 to display maps with the location-based data from the second client host 2750 overlaid thereon, while the second client host 2750 stores the location-based data locally in storage device 2754, without permanently storing the data in the storage device 2704 of server host 2700. According to this variation, individual users can act as private content providers for the system. Rather than turning their location-based data over to the server 2700, the user of client 2750 maintains control of the data and responsibility for storing the data permanently (or for as long as it is to be made available for other users), and controls access to the data. The client 2750 can make the location-based data and maps available to the user of client 2740 through a hypertext link provided in an HTML message from email application 2758, or on a web page 2756 hosted on client 2750. The server 2702 does not need to maintain any type of index of the privately maintained location-based data stored in storage device 2754.

FIG. 26 is a flow chart diagram of this variation. At step 2602, the user of the second client 2750 ("the content owner") provides an invitation to the user of the first client 2740 ("the recipient") by way of an email message (preferably HTML format) from email application 2758 or a web page 2756. Preferably, the invitation includes a hypertext link to the application server 2702, and identifies the location of the data content that is to be overlaid on the map. The link is displayed on the screen of the first client computer 2740.

At step 2604, the recipient uses the link in the message or web page to visit the web page of the application server 2702 associated with the mapping function.

At step 2606, the client computer 2740 requests that application server 2702 generate a map with the location based information from the content owner's computer 2750. Preferably, all the information concerning the location of the content needed by the application server 2702 is also provided to the application server automatically when the client computer 2740 clicks on the link to access the application server. In other embodiments, the step 2606 of requesting the map and location-based data of the content owner is a separate step that is performed manually using instructions in the message or web page that invites the recipient to view the map.

At step 2607, the application server 2702 requests the map data from the map server 2712. In some embodiments, the map server 2712 is in a separate host 2710 different from the application server host 2700. In other embodiments, the map server 2712 is in the same host 2700 as the application server.

At step 2608, the map server 2712 provides the map data to the application server 2702.

At step 2610, the application server transmits the map data to the first client computer 2740.

At step 2611, if the location based data is in the second client, then step 2612 is performed.

At step 2612, the application server 2702 requests the location-based data from the second client computer 2750, using the path information provided by the first client to the application server. (This is part of the information originally provided by the second client 2750 to the first client 2740 via the link in the email or web page).

At step 2614, the application server 2702 receives the location-based data from the second client computer 2750. The application server 2702 is not required to save the location-based data locally in any persistent or non-volatile storage device.

At step 2616, the application server 2702 can transmit the location-based data to the first client computer 2740 without permanently storing the location-based data in the server computer 2700.

At step 2618, the client application 2746 in the first client computer 2740 generates a rendering of the location-based data overlaid on the map.

At step 2620, the client computer 2740 displays the rendering in the first client's web browser 2744. The client can interact with the map by holding the cursor over or selecting one of the icons overlaid on the map, in the manner described above.

The method of FIG. 26 allows any private content owner user to utilize capabilities of the application server 2702 to allow other clients to locally generate map overlays with private data of the content owner. The content owner is not required to store the location-based content on the application server host 2700, or purchase or maintain its own copy of a map generation program.

In addition, the above method allows a portal or Internet service provider (ISP) to offer the mapping service to its users without having to assume the responsibility or expense of providing any long term storage for the content. At the same time, it allows the portal or ISP to control the quality and/or limit the type of content that it is perceived to endorse by making such content available to the general public.

The above method also improves system efficiency over a mapping system in which all the rendering of content overlaid on maps is done on the server side. The recipient client 2740 can generate the maps with overlaid location-based data locally in the browser 2744 of host 2740, which allows the recipient computer to interact with the data locally, in ways that would not be practical if the rendering is generated in the server host 2700 and transmitted to the client 2740 as a single image. The client host 2740 can cache any maps and location-based data it receives in a local cache 2743, for generating revised renderings of the map with different subsets of the location-based data on the map. In many cases, this allows the client to generate the revised renderings without downloading the same information from the server 2702 all over again. If the user subsequently issues a request for different location-based information overlaid on the same map, the cache 2743 can provide the map, and the client 2740 would, at most, only have to obtain the location-based data for the second query.

The ability for the client to generate the local renderings from the cache is enhanced if related location-based data are proactively transmitted each time a request for a map is sent to the application server. For example, at the time the map and the location-based data are transmitted to the client 2740, the server 2702 can obtain ("pre-fetch") from the content owner computer 2750 all of the location-based data in the designated portion of the storage device 2754 in host 2750, or all of the location-based data pertinent to the geographic area covered by the requested map. Upon a cursor roll-over or upon selection of one of the interactive icons on the display of host 2740, the additional data describing the item associated with that icon on the map can be obtained locally from the cache 2743, instead of issuing a request for the information from the server 2702.

In another example for using the system shown in FIGS. 26 and 27, the content server host 2720 may be associated with a separate web site or web service application 2726 that provides a separate entry point for users to access the map data with the web service's content overlaid thereon. The content is published (and stored) on the web site or web application 2726, and the application server 2702 can be used to provide maps. This allows a commercial (or non-profit) web service to obtain access to the mapping services in a manner similar to that described above for a personal web site owner.

For example, the web application 2726 may provide an online classified ad service, of a type provided by such web services as www.craigslist.com. The application 2726 may allow its users to query the web application 2726 for all the advertised items meeting a given query criteria (e.g., three-bedroom apartments in the San Francisco area that allow cats and dogs). But the web application owner may not want to incur the expense of developing a mapping capability. Instead, the web application 2726 could include a button or hyperlink on its page for displaying the query results on a map. Upon selection of the button or hyperlink, the web application 2726 can automatically transmit a map request to application server 2702, including the locations of all of the points to be overlaid on a map (either in latitude longitude format, or street address format). In some embodiments, the content owner does not want to transmit any of the query-result data (except for the locations of points) to the application server 2702, and the rendering consists of non-interactive symbols overlaid on the map, with no text or additional information. For purpose of maintaining confidentiality and avoiding transmission of its query result information to server 2702, the application 2726 may request the same generic-type icons for all of the queries that it sends to application server 2702. Upon a cursor rollover or selection, the only information that may be displayed would be limited to (at most) street addresses at each point.

In other embodiments, where the content owner is willing to transmit additional information to the application server 2702 for inclusion with the map, the web application 2726 can also send the text that is to be displayed when the user holds the mouse over or clicks on one of the icons. Then the client 2740 can generate a rendering of the map with interactive icons.

The program flow in this example is the same flow as shown in FIG. 26, except that in steps 2611, 2612 and 2614, the application server 2702 interacts with the web application 2726 instead of the second client 2750.

The present invention may be embodied in the form of computer-implemented processes and apparatus for practicing those processes. The present invention may also be embodied in the form of computer program code embodied in tangible media, such as floppy diskettes, read only memories (ROMs), flash memories, CD-ROMs, hard drives, ZIP™ disks, or any other computer-readable storage medium, wherein, when the computer program code is loaded into and executed by a computer, the computer becomes an apparatus for practicing the invention. The present invention may also be embodied in the form of computer program code, for example, whether stored in a storage medium, loaded into and/or executed by a computer, or transmitted over some transmission medium, such as over the electrical wiring or cabling, through fiber optics, or via electromagnetic radiation, wherein, when the computer program code is loaded into and executed by a computer, the computer becomes an apparatus for practicing the invention. When implemented on a general-purpose processor, the computer program code segments configure the processor to create specific logic circuits.

Although the invention has been described in terms of exemplary embodiments, it is not limited thereto. Rather, the appended claims should be construed broadly, to include other variants and embodiments, which may be made by those skilled in the art without departing from the scope and range of equivalents of the invention.

What is claimed is:

1. A method comprising the steps of:
   receiving, over a network using a computing device, a map request from a first user at a first client computer transmitted in response to a selection of a link on the first client computer, the link received at the first client computer from a second client computer of a second user, the map request comprising a request for data for generating a map of a geographical area, and a request for user-generated location-based data relating to the geographical area stored on the second client computer, the request for user-generated location-based data comprising path information to the user-generated location-based data on the second client computer;
   in response to receiving the map request:
      transmitting, over the network, using the computing device, to a map server, the request for data for generating the map of the geographical area;
      receiving, over the network, using the computing device, from the map server, the data for generating the map of the geographical area;
      transmitting, over the network, using the computing device, to the first client computer, the data for generating the map of the geographical area;
      transmitting, over the network, using the computing device, to the second client device, the a request for a set of user-generated location-based data comprising all user-generated location-based data stored on the second client computer;
      receiving, over the network, using the computing device, from the second client device, the set of user-generated location-based data;
      separately transmitting, over the network to the first client device as another transmission parallel to said transmission of data for generating the map of the geographic area, the set of user-generated location-based data without permanently storing the data and without indexing the data, such that the set of user-generated location-based data is transmitted separately and in parallel from the data for generating the map.

2. The method according to claim 1, such that the user-generated location-based data comprises a photograph of a location.

3. The method according to claim 1, such that the link on the first client computer transmitted to the first client computer from the second client computer by the second user was received by the first client device in a message from the second client computer.

4. A computing device comprising:
   a processor;
   a non-transitory computer-readable storage medium for tangibly storing thereon program logic for execution by the processor, the program logic comprising:
      logic executed by the processor for receiving, over a network, a map request from a first user at a first client computer transmitted in response to a selection of a link on the first client computer, the link received at the first client computer from a second client computer of a second user, the map request comprising a request for data for generating a map of a geographical area, and a request for user-generated location-based data relating to the geographical area stored on the second client computer, the request for user-generated location-based data comprising path information to the user-generated location-based data on the second client computer;
      logic executed by the processor for, in response to receiving the map request:
         transmitting, over the network, to a map server, the request for data for generating the map of the geographical area;
         receiving, over the network, from the map server, the data for generating the map of the geographical area;
         transmitting, over the network, to the first client computer, the data for generating the map of the geographical area;
         transmitting, over the network to the second client device, the a request for a set of user-generated location-based data comprising all user-generated location-based data stored on the second client computer;
         receiving, over the network, from the second client device, the set of user-generated location-based data;
         separately transmitting, over the network to the first client device as another transmission parallel to said transmission of data for generating the map of the geographic area, the set of user-generated location-based data without permanently storing the data and without indexing the data, such that the set of user-generated location-based data is transmitted separately and in parallel from the data for generating the map.

5. A non-transitory computer readable storage medium having computer-executable instructions for a method comprising the steps of:
   receiving, over a network using a computing device, a map request from a first user at a first client computer transmitted in response to a selection of a link on the first client computer, the link received at the first client computer from a second client computer of a second user, the map request comprising a request for data for generating a map of a geographical area, and a request for user-generated location-based data relating to the geographical area stored on the second client computer, the request for user-generated location-based data comprising path information to the user-generated location-based data on the second client computer;

in response to receiving the map request:

transmitting, over the network, using the computing device, to a map server, the request for data for generating the map of the geographical area;

receiving, over the network, using the computing device, from the map server, the data for generating the map of the geographical area;

transmitting, over the network, using the computing device, to the first client computer, the data for generating the map of the geographical area;

transmitting, over the network, using the computing device, to the second client device, the a request for a set of user-generated location-based data comprising all user-generated location-based data stored on the second client computer;

receiving, over the network, using the computing device, from the second client device, the set of user-generated location-based data;

separately transmitting, over the network to the first client device as another transmission parallel to said transmission of data for generating the map of the geographic area, the set of user-generated location-based data without permanently storing the data and without indexing the data, such that the set of user-generated location-based data is transmitted separately and in parallel from the data for generating the map.

6. The method according to claim 1, such that the user-generated location-based data includes a written description of a location generated by the second user.

7. The system according to claim 4, such that the user-generated location-based data includes a photograph of a location on the map.

8. The system according to claim 4, such that the user-generated location-based data includes a written description of a location on the map, and such that the written description is generated by a user of the second client computer.

9. The non-transitory computer readable storage medium according to claim 5, such that the user-generated location-based data includes a photograph of a location on the map.

10. The non-transitory computer readable storage medium according to claim 5, such that the user-generated location-based data includes a written description of a location on the map, and such that the written description is generated by a user of the second client computer.

\* \* \* \* \*